United States Patent

Brown

[15] 3,680,093
[45] July 25, 1972

[54] DIGITAL TARGET ACQUISITION SYSTEM

[72] Inventor: Claude W. Brown, China Lake, Calif.

[73] Assignee: The United States of America as represented by the Secretary of the Navy

[22] Filed: Feb. 11, 1970

[21] Appl. No.: 10,542

[52] U.S. Cl. ............................ 343/7 ED, 343/5 DP, 343/6 R
[51] Int. Cl. ............................................. G01s 9/02
[58] Field of Search ............ 343/6 ND, 6 TV, 6, 7 ED, 5 DP; 244/3.13

[56] References Cited

UNITED STATES PATENTS

| | | | |
|---|---|---|---|
| 2,968,997 | 1/1961 | Newton, Jr. et al. | 343/7 ED |
| 3,560,971 | 2/1971 | Alsberg et al. | 343/6 R |
| 2,660,371 | 11/1953 | Campbell et al. | 343/7 ED |
| 2,947,982 | 8/1960 | Newell | 343/7 ED |
| 2,959,779 | 11/1960 | Miller et al. | 343/6 TV |
| 3,169,727 | 2/1965 | Schroader et al. | 244/3.13 |

Primary Examiner—Malcolm F. Hubler
Attorney—R. S. Sciascia and Roy Miller

[57] ABSTRACT

A digital target acquisition system for assisting the operators of manually controlled theodolites acquiring fast maneuvering targets. The system compares the pointing angles of a theodolite to acquisition orders transmitted by a remote range-control central and supplies the theodolite operator with visual error indications that will enable him to train his camera on the designated target. The system is capable of simultaneously assisting the operators of up to four theodolites in acquiring four different targets.

9 Claims, 24 Drawing Figures

INVENTOR
CLAUDE W. BROWN
BY
ROY MILLER
ATTORNEY.

POSITIONING
ORDER (PO)       001 001 010 000 = 52 DEG

ENCODER
READING (EN)     000 100 101 000 = 26

ERROR (E)        000 100 101 000 = 26

ZEROING
WORD (ZE)        000 010 010 100 = 13

TRUE
ERROR (TE)       000 010 010 100 = 13

PO   000 011 100 100 = 20 DEG

EN   000 100 101 000 = 26

E    111 110 111 100 = 354

ZE   000 010 010 100 = 13

TE   111 100 101 000 = 341

POSITIONING
ORDER (PO)       111 110 111 100 = 354 DEG

ENCODER
READING (EN)     000 100 101 000 = 26

ERROR RE-
MAINDER (E)      111 010 010 100 = 328

ZEROING
WORD (ZE)        000 010 010 100 = 13

TRUE
ERROR (TE)       111 000 000 000 = 315

TWO'S COM-
PLEMENT (2)      001 000 000 000 = 45

| POSITIONING ORDER | 1 0 0 0 1 1 1 0 0 1 0 0 | = 200 DEG |
| --- | --- | --- |
| ENCODER REGISTER | 0 0 1 1 0 0 1 0 1 0 0 0 | = 71 |
| ERROR | 0 1 0 1 1 0 1 1 1 1 0 0 | = 129 |
| ZEROING REGISTER | 0 0 0 0 0 0 0 0 0 0 0 0 | = 0 |
| TRUE ERROR | 0 1 0 1 1 0 1 1 1 1 0 0 | = 129 |
| TEST LAMPS | ⌀ ⑪ ⌀ ⌀ ⑨ ⑧ ⌀ ⌀ ⑥ ⑤ ④ ③ ⌀ ⌀ | (WHITE IS LIGHTED) |

3,680,093

DIGITAL TARGET ACQUISITION SYSTEM

GOVERNMENT INTEREST

The invention described herein may be manufactured and used by or for the Government of the United States of America for governmental purposes without the payment of any royalties thereon or therefor.

BACKGROUND OF THE INVENTION

The units comprising the target acquisitions system operate as parts of a range control complex. The purpose of the target acquisition system is to coordinate the operation of many tracking theodolites and to assign them to various targets flying through the air space of the test ranges. The functions of each unit are; (1) to detect acquisition orders addressed to anyone of the theodolites in its camera site, (2) to compare the instantaneous azimuth and elevation of that theodolite to those of the designated target, (3) to convert the theodolite pointing errors into up, down, left, or right orders for the theodolite operator and (4) to display those orders through four error lamps in the eyepiece of the theodolite sighting telescope.

The theodolites of the test ranges are used primarily to photograph aircraft and missiles in rapid flight. Though the operators can and do track their targets manually while the cameras are working, they must rely on data from remote radars for initial target acquisition. The acquisition data, in the form of azimuth and elevation orders, are supplied by the range control central as part of the normal target designation message.

DESCRIPTION OF THE PREFERRED EMBODIMENT

Figure 1:
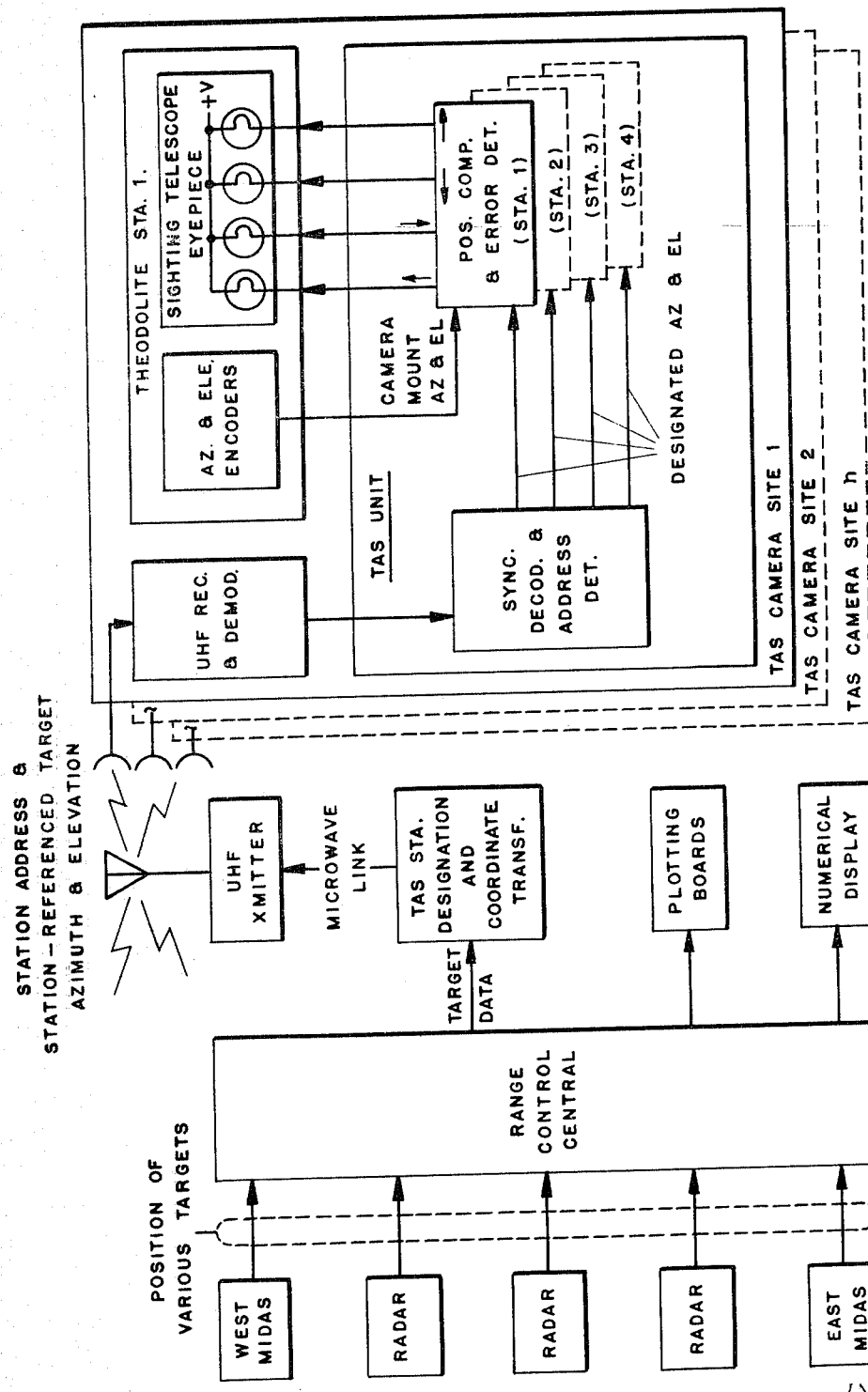
FIG. 1 is a simplified diagram of the range control system.

In FIG. 1, the Range Control Central derives the instantaneous positions of all targets flying over or near the test ranges from two MIDAS (Missile Intercept Data Acquisition System) sites and its own tracking radars. Whenever one of those targets is to be acquired by a theodolite, its position coordinates are applied to the TAS, where they are transformed to azimuth and elevation orders zero-referenced to the geographic location of the selected theodolite. These orders and the theodolite address are then digitally encoded and broadcast to all TAS Camera Sites through a UHF Transmitter.

The camera sites—each containing a UHF receiver, a TAS unit, and one, two, three, or four theodolite stations—are emplaced at irregular intervals throughout the test ranges. During a typical mission, several stations may be used to track and photograph the same target, but each station is sent a different azimuth-and-elevation message because each has a different geographic reference point. The individual messages are identified by preassigned station addresses and consist of a Start-Of-Message (SOM) pulse and a 36-bit phrase composed of 12 bits of address, 12 bits of azimuth order, and 12 bits of elevation order. Each message is updated and repeated at a rate of five times per second.

OPERATION OF THE TAS UNIT

The UHF Receiver at each site demodulates all messages and applied them to the TAS Unit, which contains an Address Detection circuit and up to four (one for each station in the site) Position-Comparison and Error-Determination circuits. The address detection circuit tests all messages and rejects those that are not addressed to any of the site's stations. When it recognizes the address of one of its stations, it accepts the associated azimuth and elevation orders and applies them to the position-comparison circuit of the addressed station.

The position-comparison circuit also receives from encoders in the station's theodolite a continuous readout of the azimuth and elevation angles of the camera mount. On receipt of a positioning order, it compares that order with the camera angle in that coordinate and applies the resulting difference—after compensating for encoder collimation errors—to the error-determination circuit. The functions of this last circuit are (1) to determine the direction in which the camera mount should move to eliminate the error, and (2) to give the theodolite operator a gross indication of the amount of movement needed to bring the target into the center of the sighting telescope image.

After determining the direction and amount of the needed correction, the error-determination circuit causes one of four (UP, DOWN, LEFT, or RIGHT) lamps in the Sighting Telescope Eyepiece to glow steadily if the error is 45° or more, to blink at a 5-cps rate if the error is between 45° and 1.4°, or to blink at a 2.5-cps rate if the error is less than 1.4°. Since the field of view of the sighting telescope is 3°, the 2.5 cps rate also serves as a warning to the operator that he should now be able to see the target. Once the operator has acquired the target visually, the TAS unit has fulfilled its functions but will continue to supply error indications as long as the TAS transmitter continues to send orders to that particular theodolite.

The TAS logic circuits are divided—both functionally and physically—into five subunits, each mounted on a separate rail within the TAS cabinet. Rail C contains the synchronization, decoding, address-detection, and timing circuits, which are common to all stations. Rails A, B, D, and E each contain the position-comparison and error-determination circuits for one station, and are identical except for two minor wiring differences. One or more of these four rails may be omitted from units that control less than four stations. For the purposes of this description, the TAS unit will be assumed to contain rails C and B only, which is actually the case whenever a unit is used in a one-station camera site.

DATA INPUT

The data input to the TAS unit from the Receiver Demodulator 200 (FIG. 2) is a continuous series of 1,520-microsecond TAS messages, repeated at a 5-cps rate. Only some of these messages will contain acquisition orders for the theodolites, and only one message in a repetition will be addressed to any one theodolite station. All messages are in digital format and consist of an SOM pulse and 36 bits of intelligence. When applied to the TAS Synchronizer 201, the messages will be in the form of an asymmetrical square wave alternating between a positive (true) level of +10 volts and ground. The duration of the SOM pulse and of the "one" and "zero" bits will be as shown in FIG. 3.

Synchronization, Decoding, and Address Detection

INTERNAL CLOCK AND SYNCHRONIZER

The internal Clock Source 202 for the TAS Unit is a free-running multivibrator that produces 200-nanosecond positive pulses at a 1-Mc rate. Synchronization of the data input to the internal clock is the function of the Synchronizer 201, which consists of DBN, DJ, DK, D, D/1, and D/2 of FIG. 4. DBN is a two-stage buffer amplifier that filters noise out of the data waveform and limits the input to the 5-volt-to-ground operating levels of the TAS Unit; DJ and DK, strapped as inverters, provide further isolation and convert the waveform from the high-level logic used by the TAS to the low-level logic of the TAS (all TAS Unit logic components operate at a true level of ground and a false level of +5 volts); D, D/1, and D/2 do the actual synchronization (see waveforms 1 through 5 and control all bit-rate shifting and timing within the unit. The outputs of the synchronizer 201 are applied to the Acquisition Message Decoder 203 and provide two of the three signals needed to operate the Shift Gates 204 of the Storage Register 205 and the Bit Counter 206.

DECODING AND START-OF-MESSAGE DETECTION

The Acquisition Message Decoder 203 is a 32-bit binary counter triggered at a 1-Mc rate. It is made up of six flip-flops (A1 through A32 in FIG. 4) and has two outputs, one at the count of 16 and one at the count of 32. Its functions are (1) to convert the output of the synchronizer 201 from the pulse-duration code employed by the TAS transmitter to the static-logic code used by the TAS Units, (2) to enable the Start-of-Message Detector 207 after receipt of each SOM pulse, and (3) to supply the serial inputs for the storage register 205 after SOM detection.

The decoder starts counting at a 1-Mc rate whenever D/2 in the synchronizer 201 goes true, and is reset whenever D/2 goes false. Since D/2 is true for 40 microseconds when a SOM pulse is received, for 20 when a bit one is received, and for 10 when a bit zero is received, A32 will go true only during reception of a SOM pulse, and A16 will go true only during reception of a SOM pulse or a bit one (see waveforms 11 and 10 of FIG. 5). A true output from A32 can therefore be used to identify the SOM pulse, and the state of A16 at the end of a bit input can be used after SOM detection to differentiate between bit ones and bit zeros. Accordingly, A32 is used to enable gate SOMJ in the start-of-message detector 207, and A16 is used to drive the first stage of the storage register 205 (AD1, FIG. 4).

The Start-of-Message Detector 207 is made up of flip-flop SOM and gates SOMJ, SOMK, and SOMR (FIG. 4). Its purpose is to control the period during which the $\overline{D/1}$ and D/2 outputs of the synchronizer 201 are allowed to trigger the storage register 205 (AD1 through 12 in FIG. 4) and the bit counter 206 (B1 through B12 in FIG. 4) through the shift gates 204 (ADT1, 2, 3 in FIG. 4). This period starts when the SOM flip-flop goes true at the first 1-Mc shift after D/1 goes false at the start of the second alternation of the SOM pulse (see waveforms 4 and 12 of FIG. 5). Its end will depend on whether the 12 bits of address following each SOM pulse are recognized by one of the four Station Address Detectors 208 (FIG.2): If they are, SOMK will be closed by the $\overline{X}$ output of the address-latch circuit 209 and the SOM flip-flop will stay true until reset by SOMR at the end of the message; if they are not, SOMK will stay open and allow B12 to reset SOM after the end of the first 12-bit rundown of the bit counter 206 (negative-going edge of waveform 21 of FIG. 5). As a result, the 12 address bits of every TAS message will be shifted into the storage register 205, but the 24 order bits that make up the reset of the message will be blocked unless the message is addressed to one of the site's stations.

ADDRESS STORAGE AND BIT COUNTING

Detection of the SOM pulse causes the shift gates 204 to start triggering the storage register 205 and the bit counter 206 at the rate at which the data bits are applied to AD1 (FIG. 4) by A16 of the acquisition message decoder 203. The trigger pulses will be unevenly spaced (waveform 16 of FIG. 5) because of the difference in the positive alternations of the ones and zeros in the data input (waveform 14 of FIG. 5), and will have a duration of one microsecond because of the interval between the switching times of D/1 and D/2 (waveforms 4 and 5 of FIG. 5).

After the first 12 shifts, the message address will be in the storage register 205, B4 and B8 will be true (waveforms 19 and 20 of FIG. 5), but B12 will still be false (waveform 21 of FIG. 5) because a flip-flop with no J, K, or DC inputs changes states only on the negative-going edges of its clock input. By the time B12 goes true as B8 goes false, the message address will have been tested and SOMK will have been preconditioned by $\overline{X}$ either (1) to allow B12 to reset SOM because the address has not been recognized, or (2) to block the B12 output and leave SOM on because the message is addressed to one of the site's stations. If the address is not recognized, SOM will go false, closing the shift gates 204 and resetting the bit counter 206 to its standby condition (the synchronizer 201 and the decoder 203 will continue to operate, but no data will be shifted into the storage register 205 until after the next SOM pulse is detected). If the address is recognized, SOM will stay true, the bit counter 206 will recycle to a count of one (waveform 17 of FIG. 5), and B12 will remain true (waveform 21 of FIG. 5); the counter 206 will then proceed into two more 12-bit counts before being turned off when SOMR resets SOM.

ADDRESS DETECTION CIRCUITS

Figure 6:
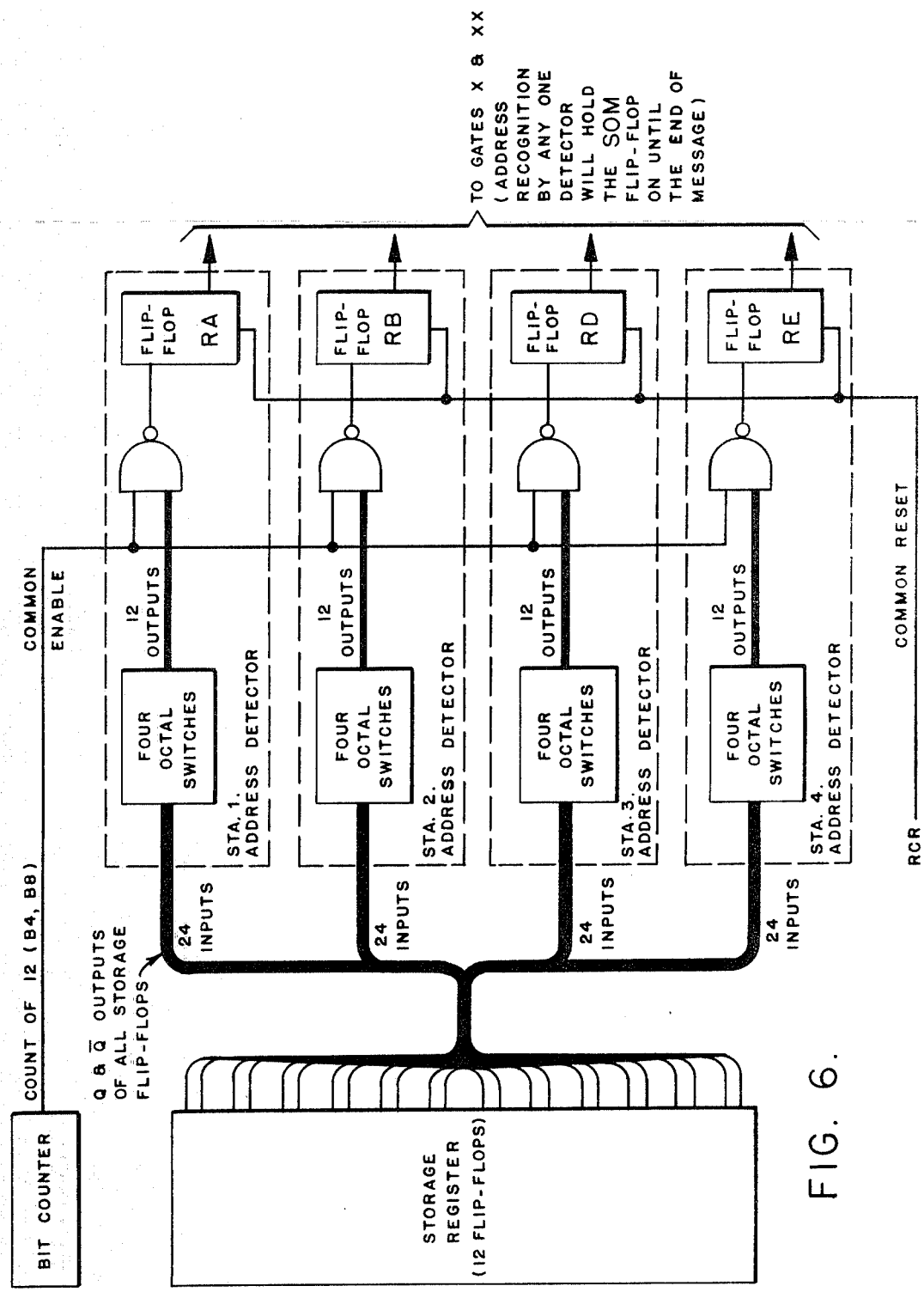
FIG. 6 is a functional diagram of a detector.

The Q and $\overline{Q}$ outputs of each flip-flop in the storage register 205 are connected in parallel to four identical address detectors 208, one for each of the four stations that the TAS unit is capable of serving. Each detector (FIG. 6) consists of a group of four octal switches, a 15-input expanded NAND gate, and a flip-flop; the four flip-flops are reset in common by a single NAND gate (RCR, FIG. 4). Since the four detectors are identical, only the Station-2 Address Detector is shown in detail in FIGS. 2 and 4; it should however be understood that all four groups of octal switches are connected in parallel to the 24 outputs of the storage register, so that all four detectors will simultaneously sample the contents of the register when the four expanded gates are enabled by B4 and B8 of the bit counter 206.

The four groups of octal switches are manual controls, installed in a row along the top of the unit's front panel. Each group is made up of four thumbwheels stamped with the numerals 0 through 7, and each thumbwheel contains three SPDT switches that automatically set to the binary equivalent of the number shown on the exposed facet of the thumbwheel. For example, a 5324 setting of the station-2 thumbwheels will automatically turn the internal SPDT switches to the settings shown in FIG. 4.

Continuing with the description of the Station-2 Address Detector, the 12 wipers of the SPDT switches are connected to the inputs of four gate expanders (RBJX2 through 5, FIG. 4), which constantly monitor the contents of the storage register 205. Directly above RBJX2 are another expander (with $\overline{X}$ as its sole input) and NAND gate RBJ, whose inputs are the combined outputs of the five expanders and the B4 and B8 outputs of the bit counter. RBJ controls the J input of address-recognition flip-flop RB, whose main function is to enable the position-comparison circuit 210 of RAIL B when the address of station 2 is detected.

The other three groups of octal switches (S101 through 104, 301 through 304, and 401 through 404) are similarly connected to the input gates of RA (FIG. 4), RD (FIG. 4), and RE (FIG. 4). In a four-station site, each switch group will be set to the address of the associated station, and the Q outputs of RA, RD, and RE will be connected to the position-comparison circuit of, respectively, Rails A, D, and E.

ADDRESS-LATCH CIRCUIT

The $\overline{Q}$ outputs of the four address-recognition flip-flops are applied to the address-latch circuit 209, which is made up of gates X, XX, and $\overline{X}$ (FIG. 4). Beside keeping SOMK from resetting SOM after address detection, this circuit ensures that the Azimuth and Elevation Timing circuit 211 do not turn on unless an address has been recognized, and keeps any positioning order whose binary count happens to duplicate that of a station address from being mistaken for the address of a new message. Briefly, X will be false and $\overline{X}$ consequently true as long as RA, RB, RD, and RE are all in the false state; whenever one of these four flip-flops recognizes an address (goes true), X will go true and enable the timing circuits, while $\overline{X}$ will go false and close the four Address Detection Gates. X and $\overline{X}$ will then stay respectively true and false until RCR resets the address-recognition flip-flops at the end of the message.

DETECTION OF THE ADDRESS OF STATION 2

Address Detection Gate RBJ is enabled by its B4 and B8 inputs each time the bit counter reaches a count of 12: that is, after the address of each message has been shifted into the storage register 205, and, but only if an address has been recognized, at the ends of the subsequent azimuth and elevation orders. With S201 through 204 set as shown in FIG. 4, the outputs of RBJX2 through 5 will be simultaneously true only when the binary equivalent of octal 5324 (101 011 010 100) is in the storage register 205. Therefore, provided $\overline{X}$ is true, RBJ will go false whenever the address preset into the station-2 octal switches is in the register 205 at the end of a countdown of the bit counter 206.

REJECTION OF SPURIOUS ADDRESSES

The function of the B4 and B8 inputs to RBJ is to ensure that the contents of the storage register 205 are not sampled until all 12 bits of the address have been stored. The function of the $\overline{X}$ input to RBJX1 is best illustrated by an example: Assume that a message intended for station 3 has been received, and that its address has been recognized by the station-3 address detector. RD will be true, $\overline{X}$ will go false, SOM will stay on, and the bit counter 206 will proceed into its second countdown while the azimuth order is being shifted into the storage register 205. At the end of the countdown, B4 and B8 will again enable all address detection gates (RAJ, RBJ, RDJ, and REJ) and, if the value of the stored order happens to be 243.6° (101 011 010 100), RBJX2 through 5 will all be true because the binary coding of this order is indistinguishable from that of the 5324 octal address of station 2. Were it not for the false $\overline{X}$ input to RBJX1, RBJ would go false and—for reasons that will become clear in later paragraphs—the subsequent elevation order for station 3 would also be applied to the position-comparison circuit of station 2. The output of $\overline{X}$ is therefore used to close all four address detection gates as soon as the address of any station is recognized, thereby ensuring the positioning orders will not be mistaken for message addresses.

ADDRESS RECOGNITION

When RBJ goes false upon detecting the address of station 2, it enables the J input of RB and allows the thirteenth ADT1 pulse to trigger the flip-flop into the true state. Once true, RB locks up through an external feedback into its own K input (so that it will not be affected by further changes in the state of RBJ) and stays true until reset by RCR at the end of the message. RA, RD, and RE operate in the same way when an address is detected by, respectively, RAJ, RDJ, or REJ.

Recognition of a station address causes the address-latch circuit 209 to close the address detection gates, to keep SOM true and the shift gates 204 open, and to enable the azimuth and elevation timing circuits 211; this occurs regardless of whether the address is recognized by RA, RB, RD, or RE. The other result of address recognition—that is, an enabling signal from the flip-flop that recognizes the address to the transfer and shift gates of one of the station rails—affects only the rail that serves the theodolite to which the message is addressed. This allows all the other outputs of Rail C to be applied directly to all station rails because only the rail enabled by the recognition flip-flop will be conditioned to accept them.

AZIMUTH AND ELEVATION TIMING CIRCUITS

The Azimuth and Elevation Timing circuits 211 are made up of six gates (UB, UC, $\overline{UC}$, UJX, UJ, and UK in FIG. 4) and three flip-flops (U, UA, and Y). Their functions are (1) to time the transfer of positioning orders into the station rails, (2) to trigger the Position Comparison Timing circuits after each order transfer, (3) to control azimuth/elevation switching within the station rails, and (4) to slave the operation and the output rate of the Blink Control circuit 212 to the 5-cps rate at which the TAS messages are received.

Before an address is recognized, the azimuth and elevation timing circuits 211 are held on standby by a false X input to UJX from the address-latch circuit 209. In this standby condition, $\overline{UC}$ is true and U, UA, and Y are false. TIMING OF ORDER TRANSFER Once an address is recognized, X goes true and the bit counter 206 proceeds into its second and third countdowns. The true X input to UJX now allows UJ to go false whenever $\overline{D/1}$, B4, and B8 are simultaneously true, a condition that exists momentarily after the ends of the positive alternations of the 24th and 36th bits of the message (waveforms 14, 19, and 20 of FIG. 5; see waveforms 4 and 5 of FIG. 5 for the relationship between D/1 and D/2). As a result, U is set to true by the 1-Mc clock immediately after a positioning order has been shifted into the storage register 205, and UA becomes true 1 microsecond later.

Figure 2A:
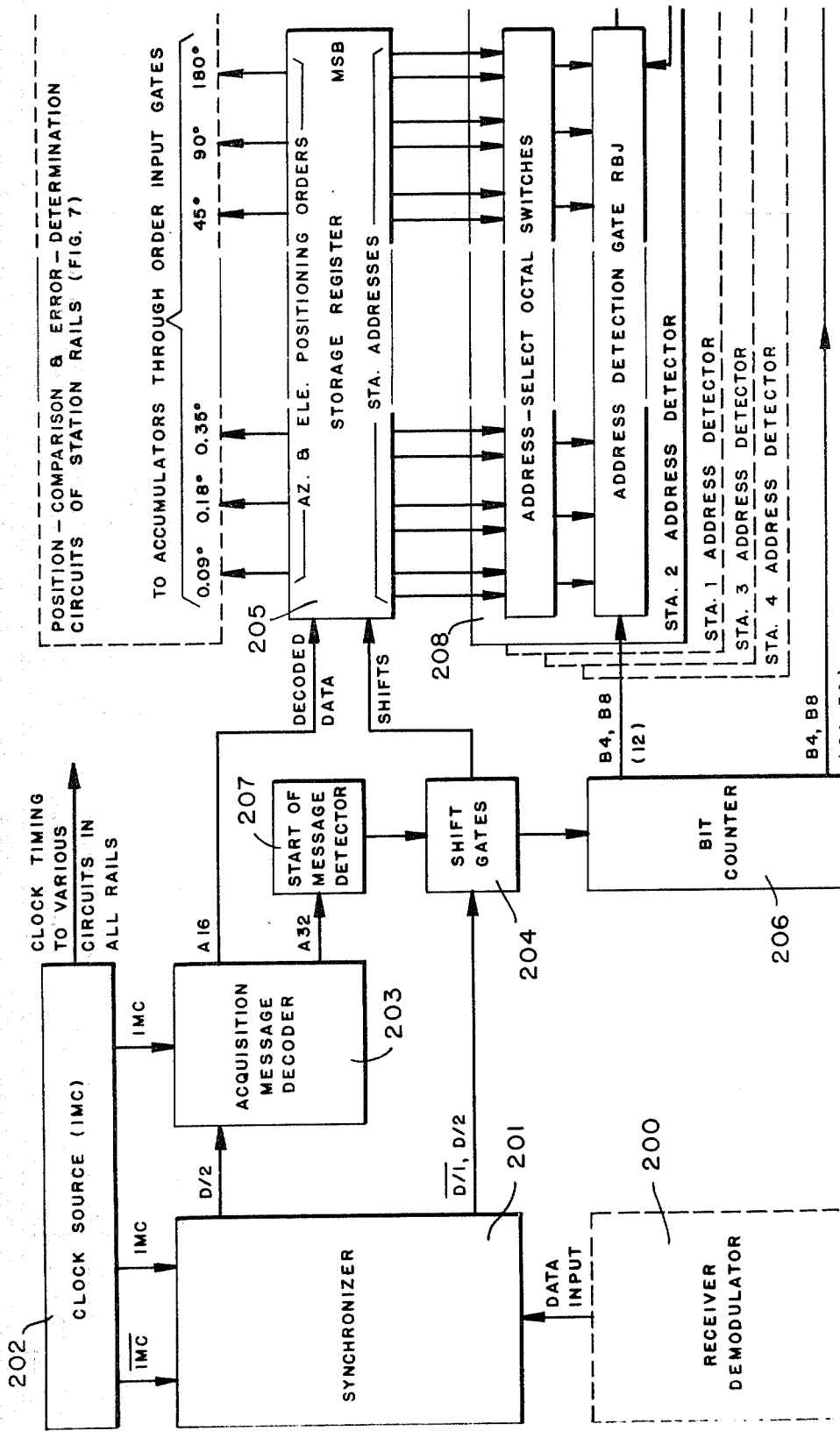
FIG. 2 is the TAS Unit Rail C block diagram.
Figure 2B:
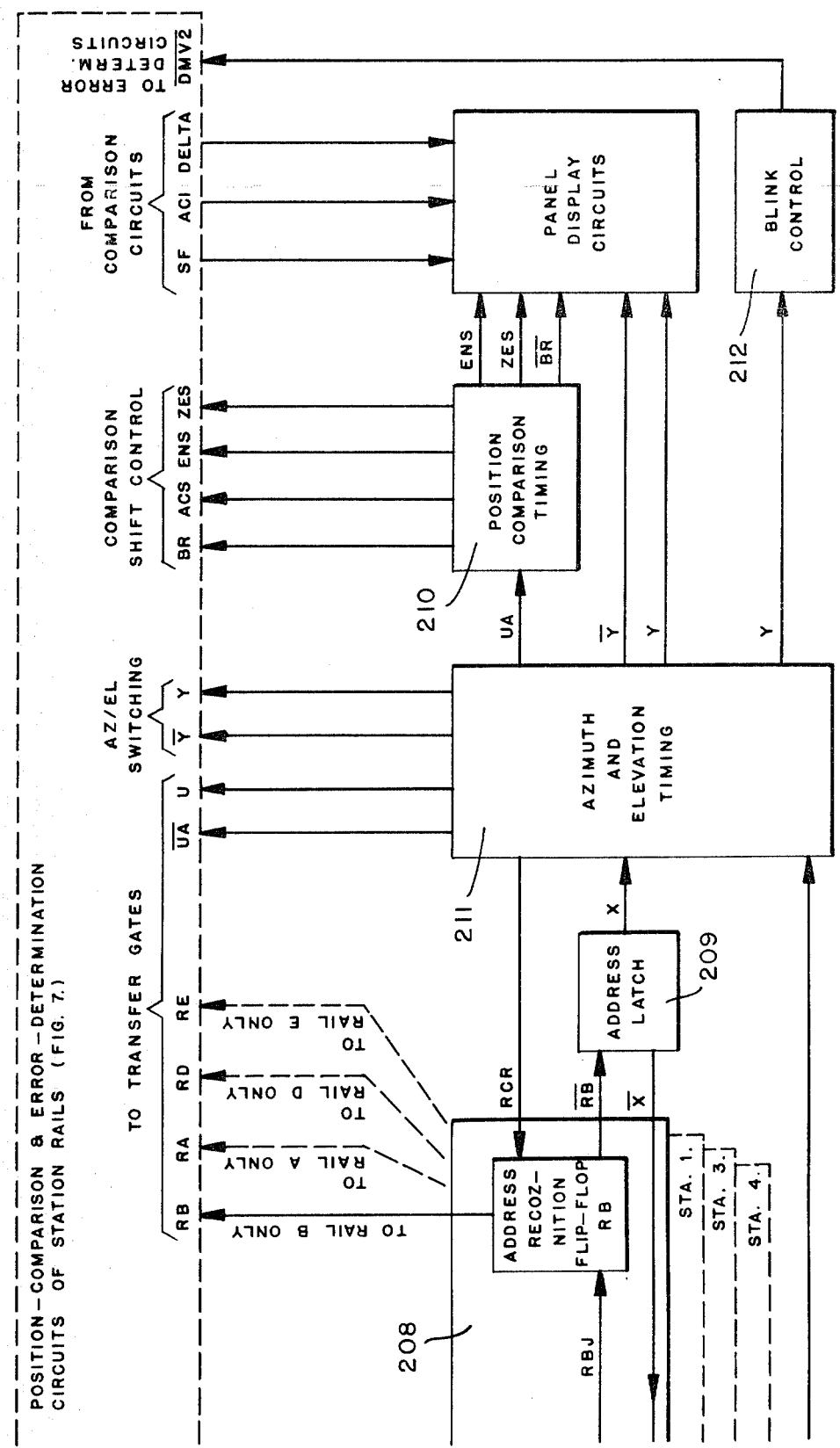
Figure 3:
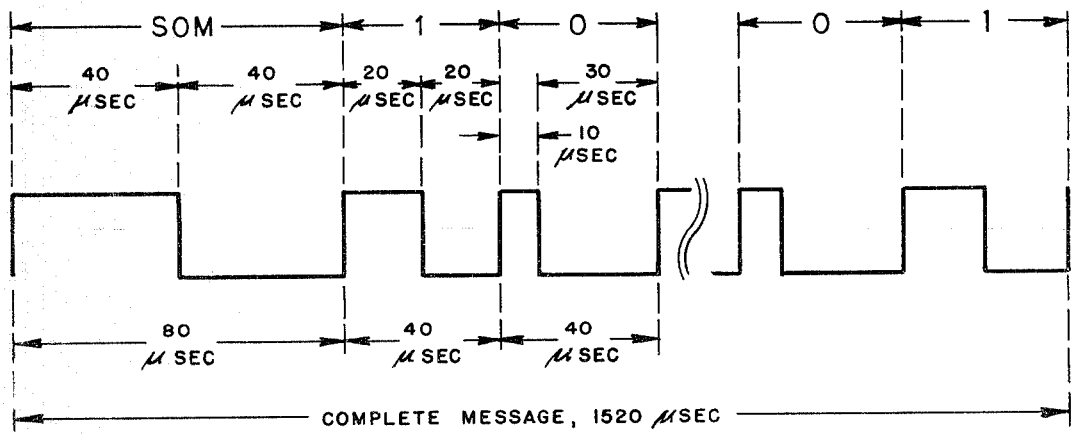
FIG. 3 is a waveform corresponding to a complete message.

As shown in FIG. 2, the U and $\overline{UA}$ outputs of the Azimuth and Elevation Timing circuit 211 are applied to the transfer gates of all station rails. The transfer gate of the rail selected at address recognition will therefore open immediately after a positioning order has been stored, causing the order to be dumped in parallel from the storage register of Rail C into the accumulator of the selected station rail. The transfer gate will then close 1 microsecond later as UA goes true, isolating the accumulator from the storage register before the next order or address begins shifting into the register.

POSITION COMPARISON TIMING

The Position Comparison Timing circuits 210 consists of gate C1T, flip-flops C1 through C8, gate BRJ, and flip-flops BR, ENS, ZES, and ACS (FIG. 4). Their purpose is to control a preset series of arithmetic operations that is carried out by the position-comparison circuit of the station rail after the transfer of each positioning order. An explanation of their functions presumes a foreknowledge of the operation of the comparison circuit.

Figure 7:
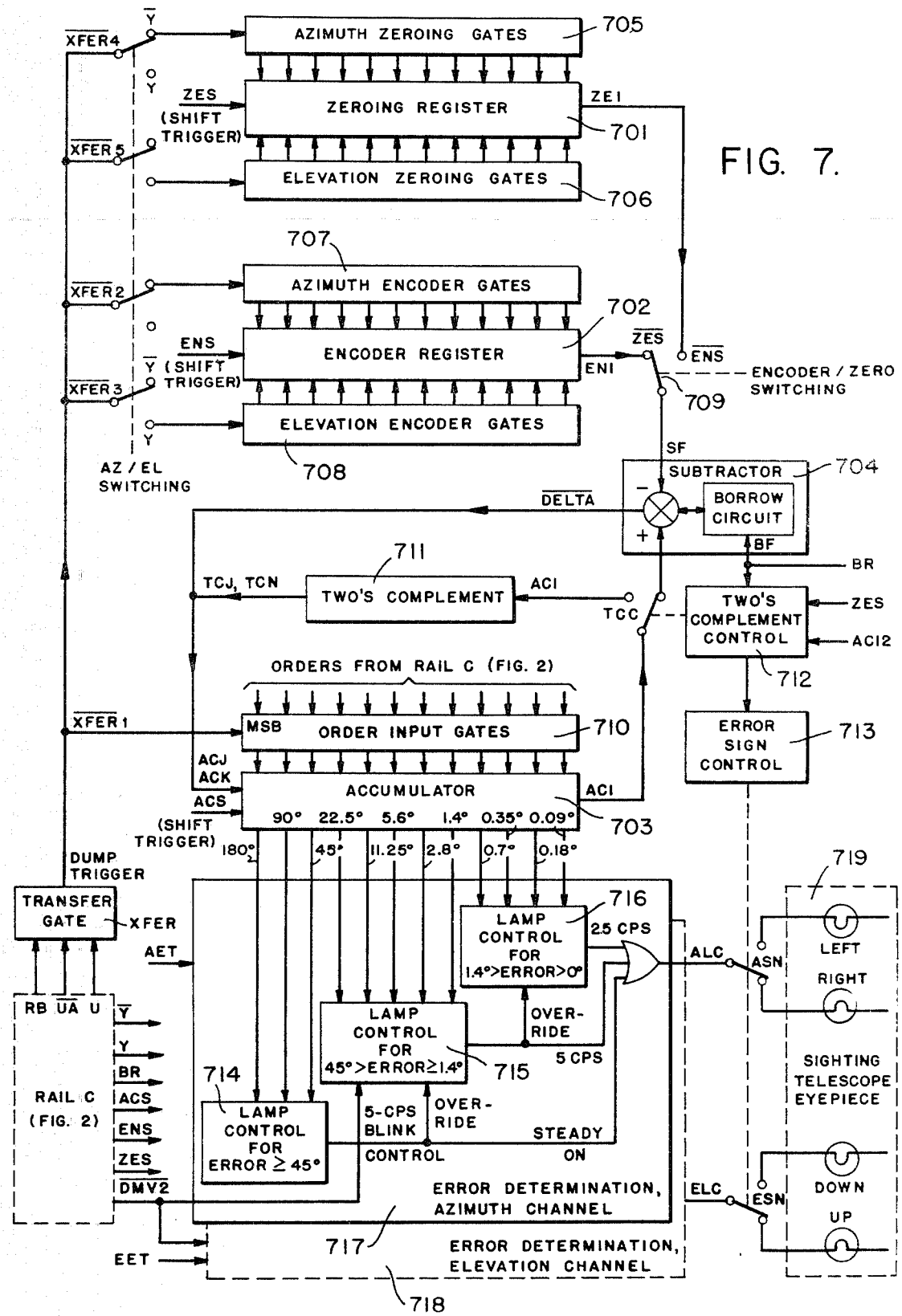
FIG. 7 is a block diagram of rails A, B, D or E.

Referring to FIG. 7, the major components of the position-comparison circuit—whose function is to compute the difference between the positioning orders and the pointing angles of the theodolite camera—are the Zeroing Register 701, the Encoder Register 702, the Accumulator 703, and the Subtractor 704. The two registers and the accumulator each contain 12 flip-flops, and are identical to each other and to the storage register 205 of Rail C; the subtractor 704 is made up of nine NAND gates and a borrow flip-flop. At the start of a comparison cycle, the positioning order is in the accumulator 703, the pointing angle of the camera (as read by a digital encoder) is in the encoder register 702, and a correction factor representing the difference between the encoder reading and the true angle of the camera is in the zeroing register 701. The accumulator 703 and the encoder register 702 are then simultaneously shifted 12 times at a 1-Mc rate, causing the order and the encoder reading to be fed serially into the subtractor 704. The subtractor 704 subtracts the encoder reading from the order and recirculates the remainder bit by bit into the accumulator 703, so that after the twelfth shift the positioning order will have been replaced by the difference between itself and the encoder reading. Following a one-microsecond pause to allow the borrow flip-flop to reset, the accumulator 703 resumes shifting, now in synchronism with the zeroing register 701. The contents of the zeroing register 701 are subtracted from the output of the accumulator 703 during the next 12 microseconds, and the remainder of this second subtraction is again recirculated into the accumulator 703. The comparison cycle then ends because the true difference between the positioning order and the pointing angle of the camera has been computed and is now stored in the accumulator 703.

Figure 8A:
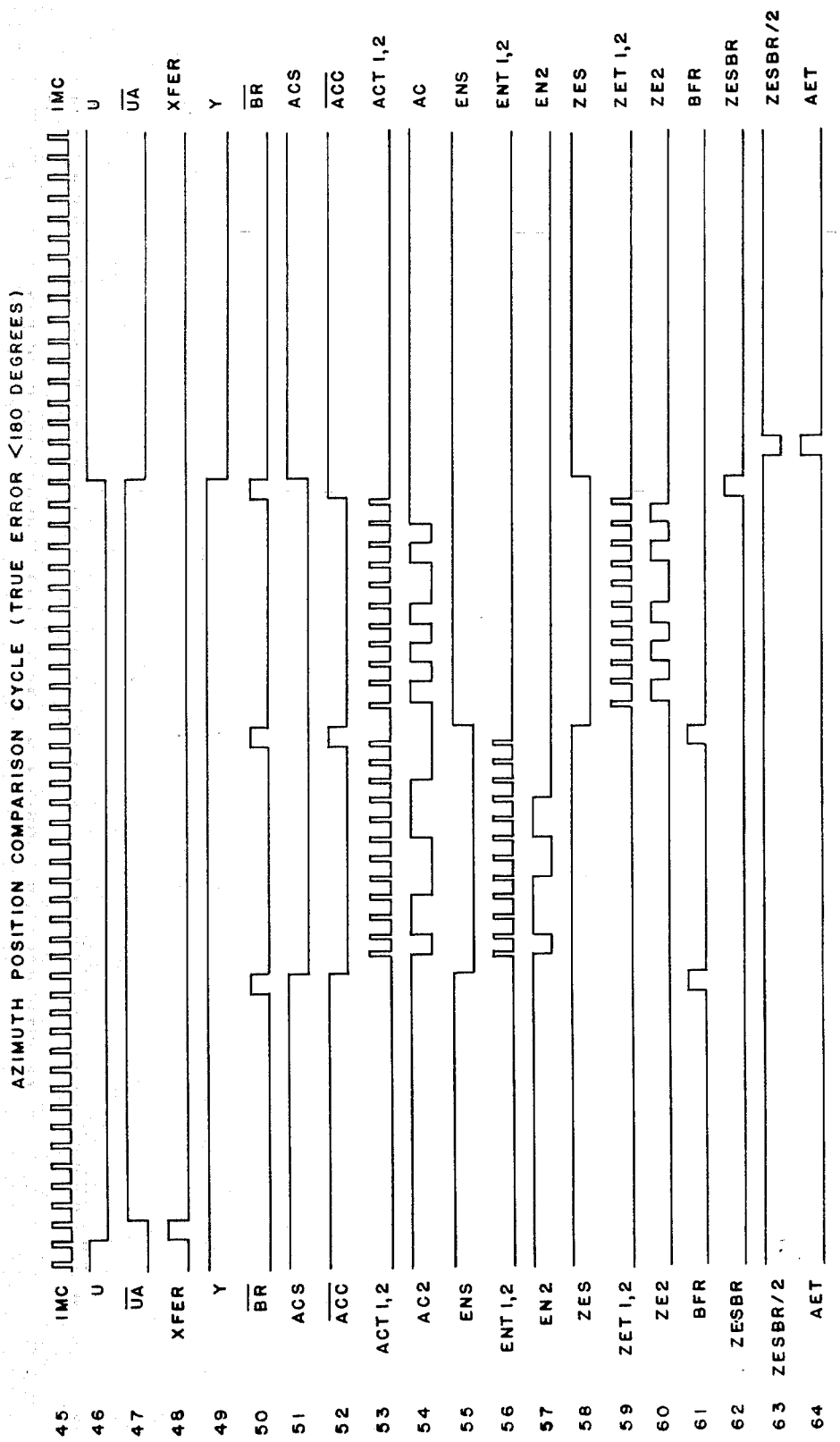
FIG. 8 illustrates the waveforms associated with FIG. 9.
Figure 8B:
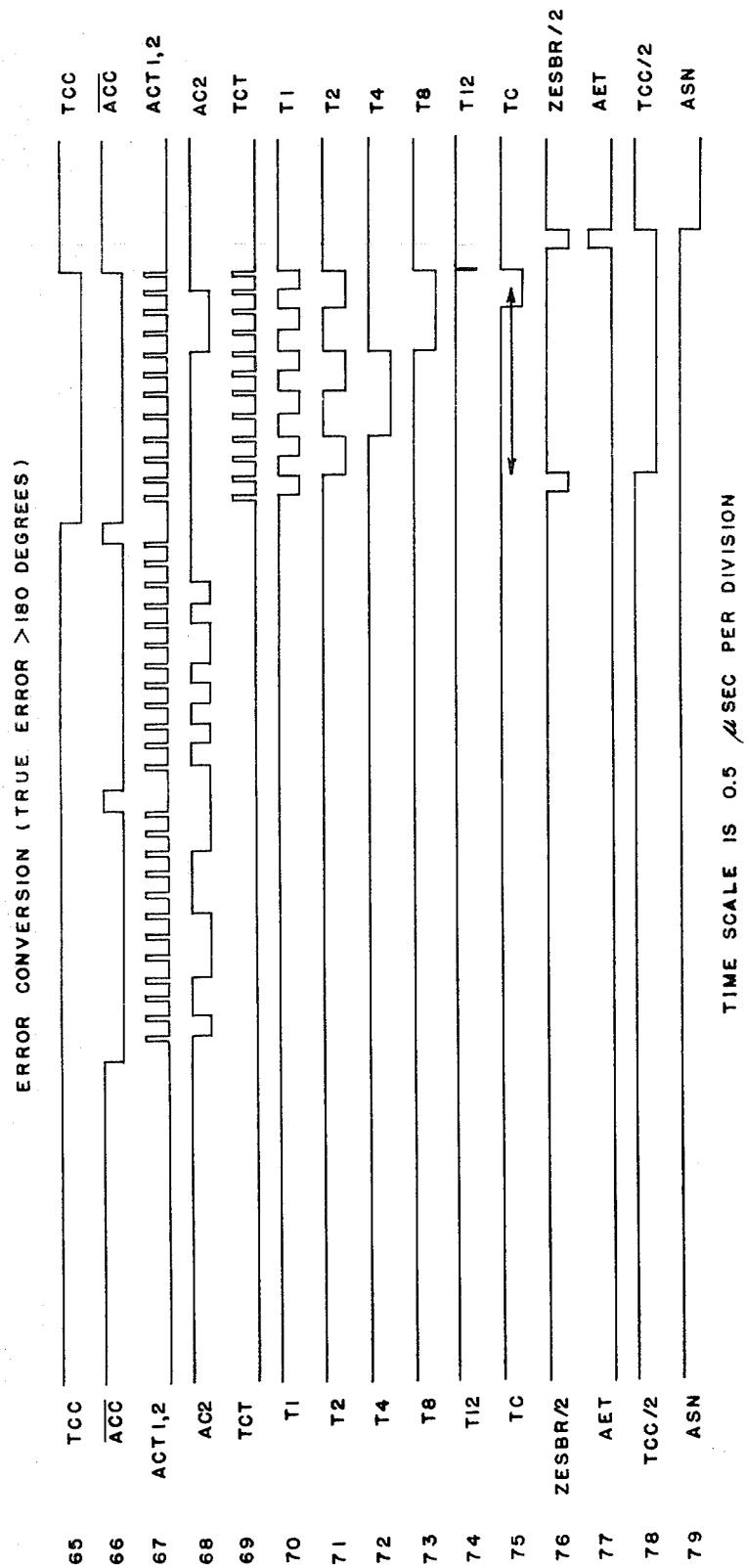
Figure 9A:
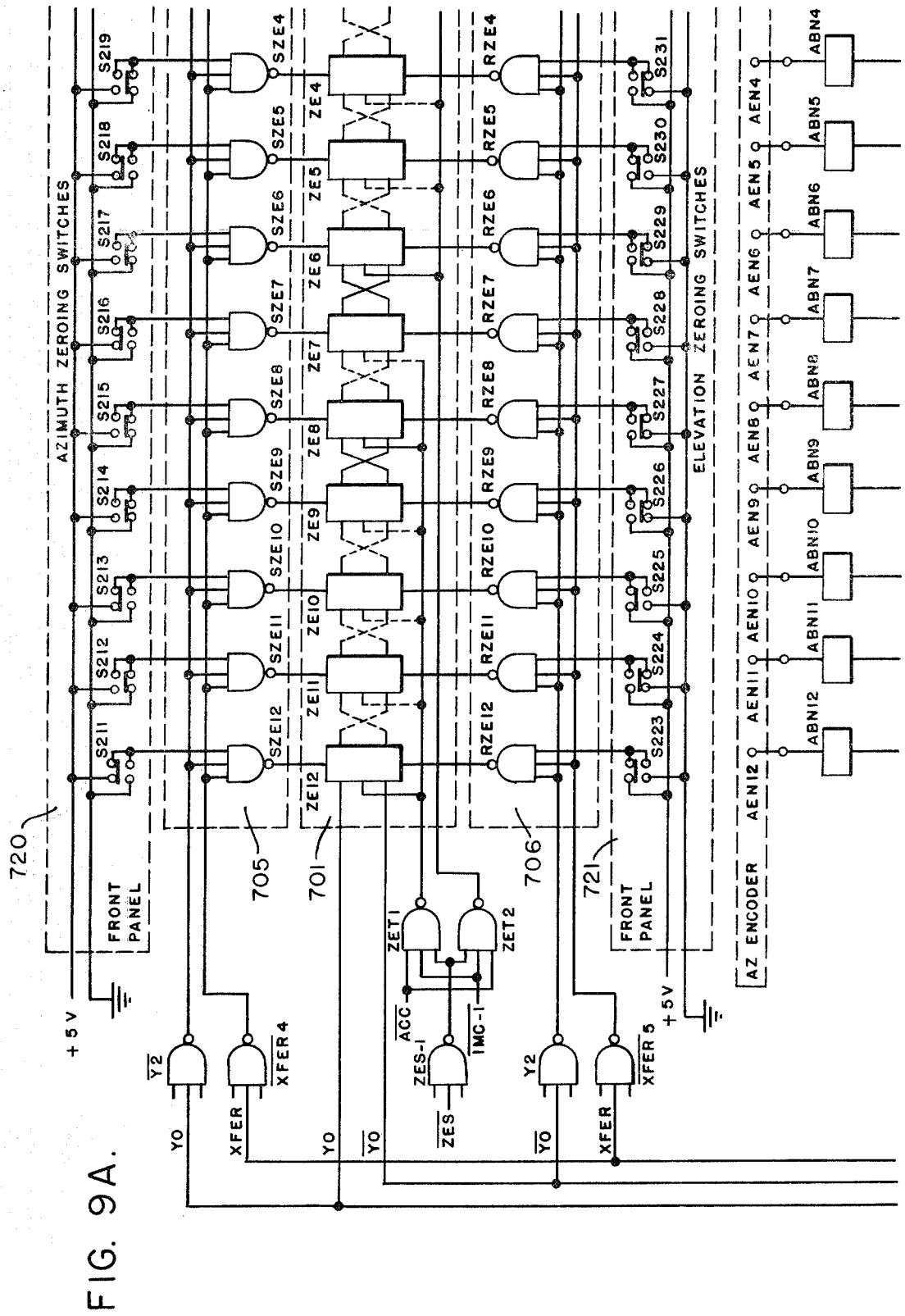
FIG. 9 is a functional diagram of the rail B position comparison and error-determination circuits.
Figure 9B:
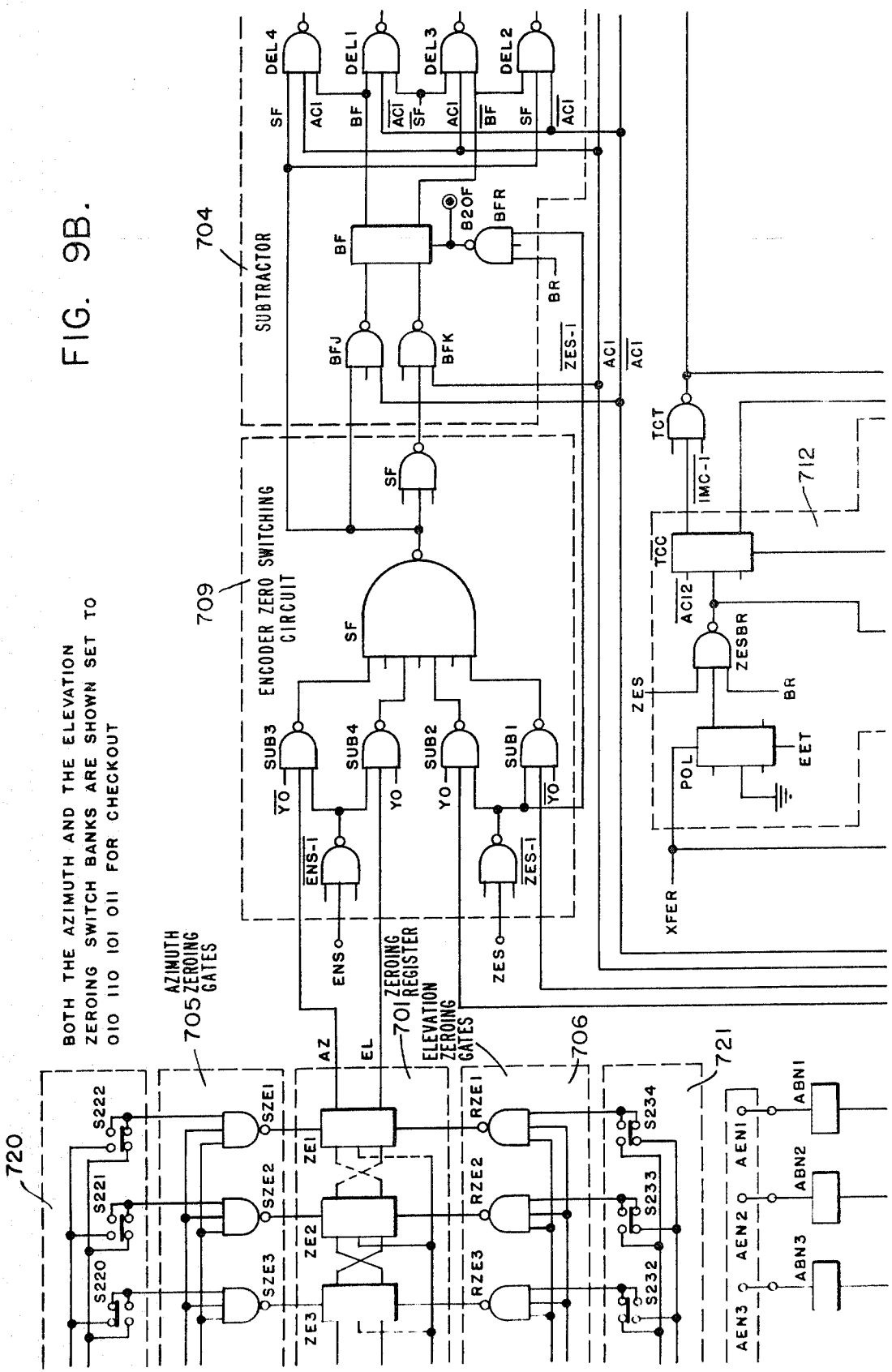
Figure 9C:
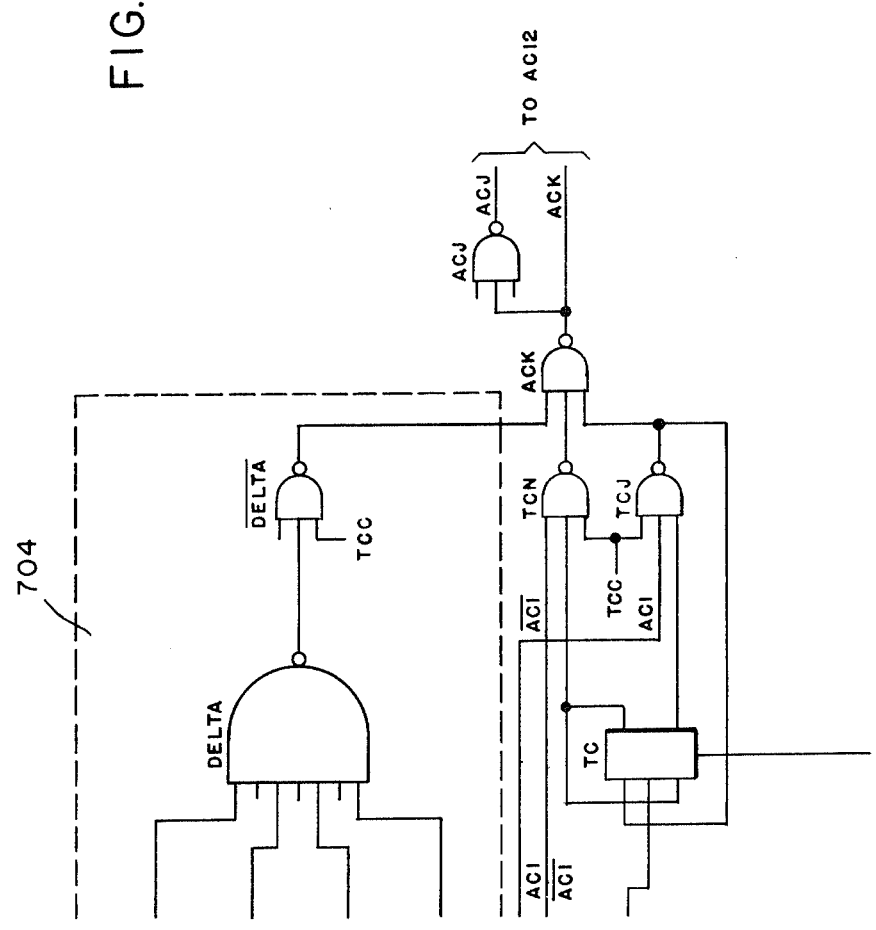
Figure 9D:
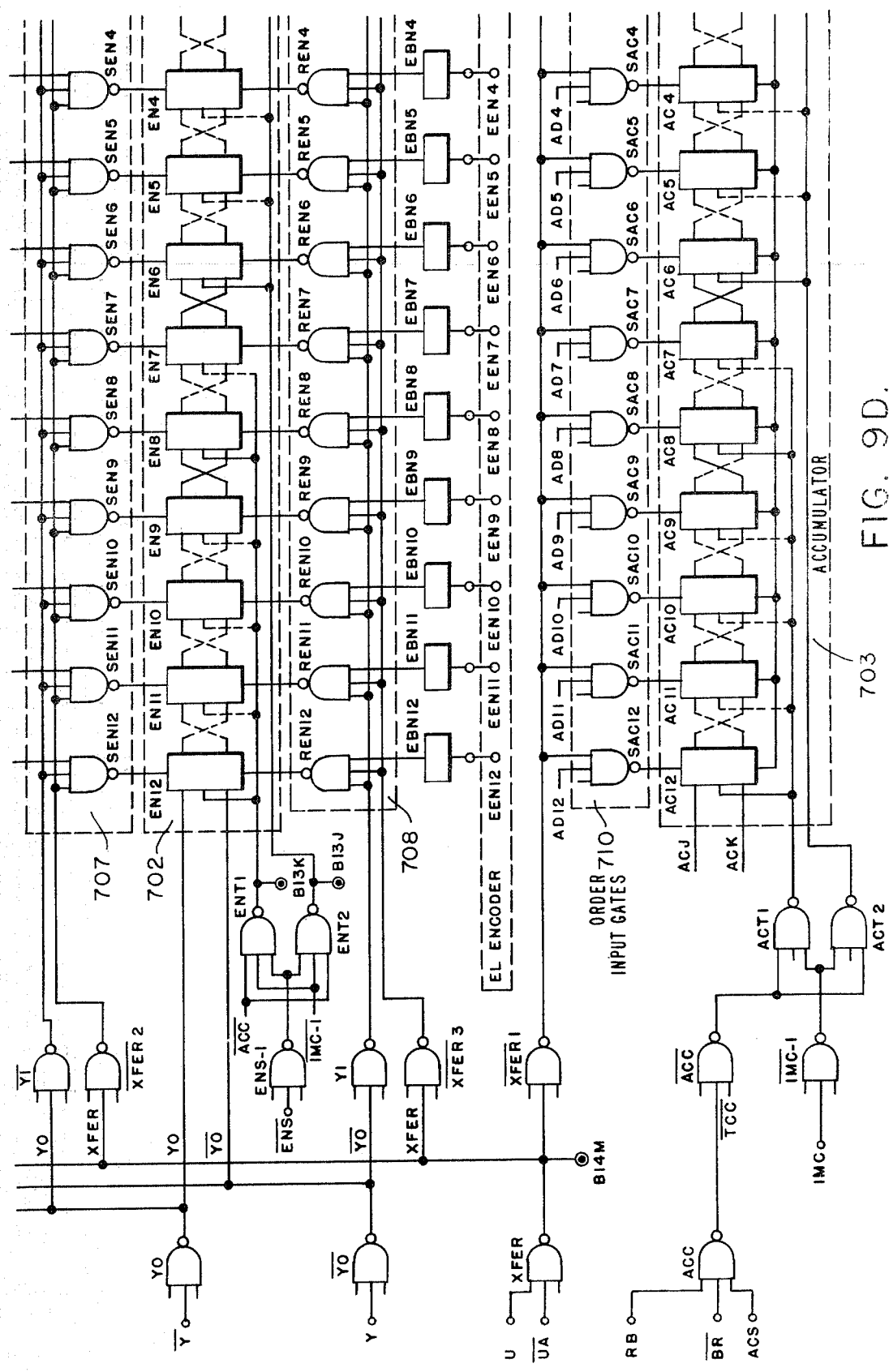
Figure 9E:
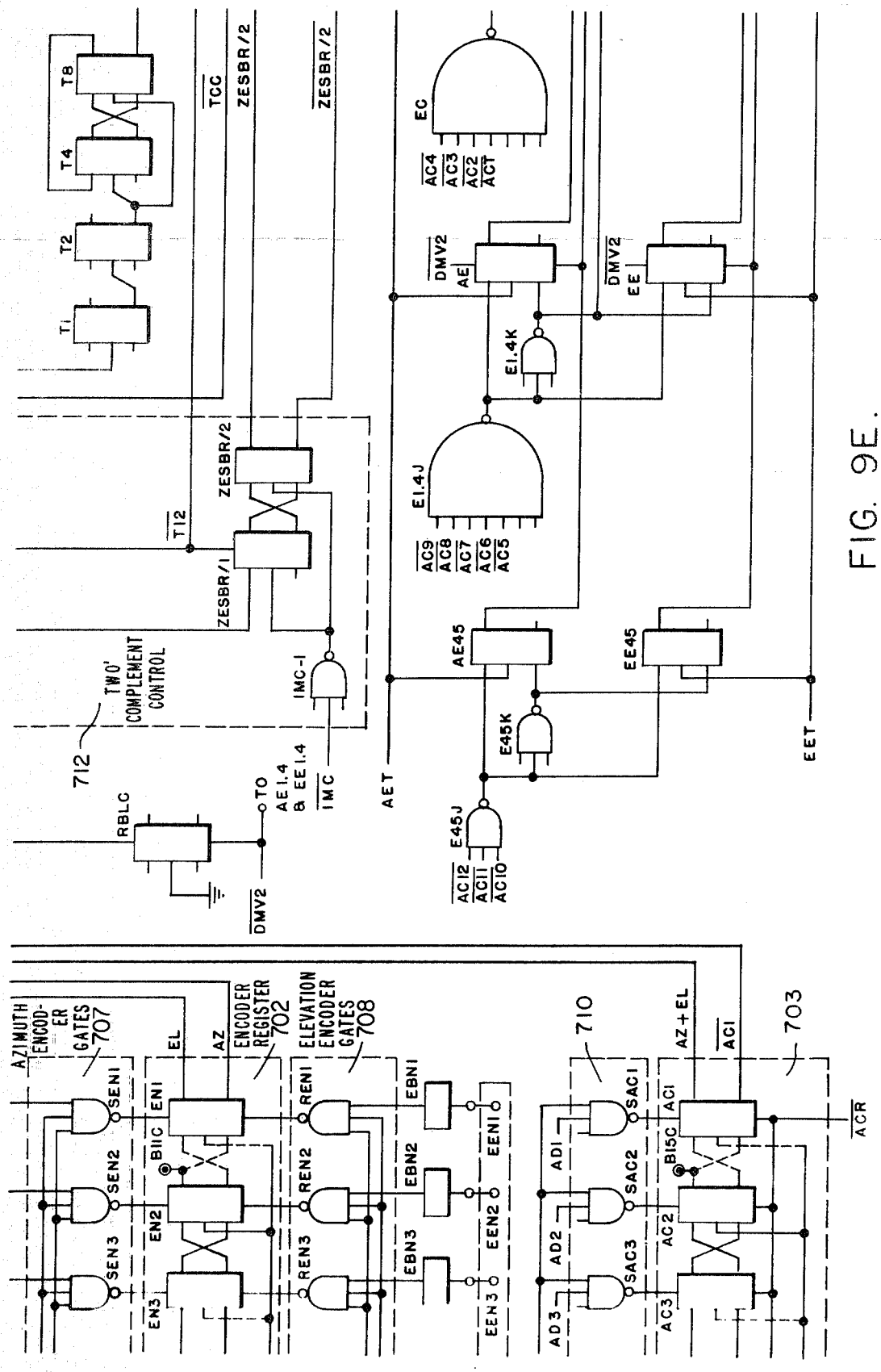
Figure 9F:
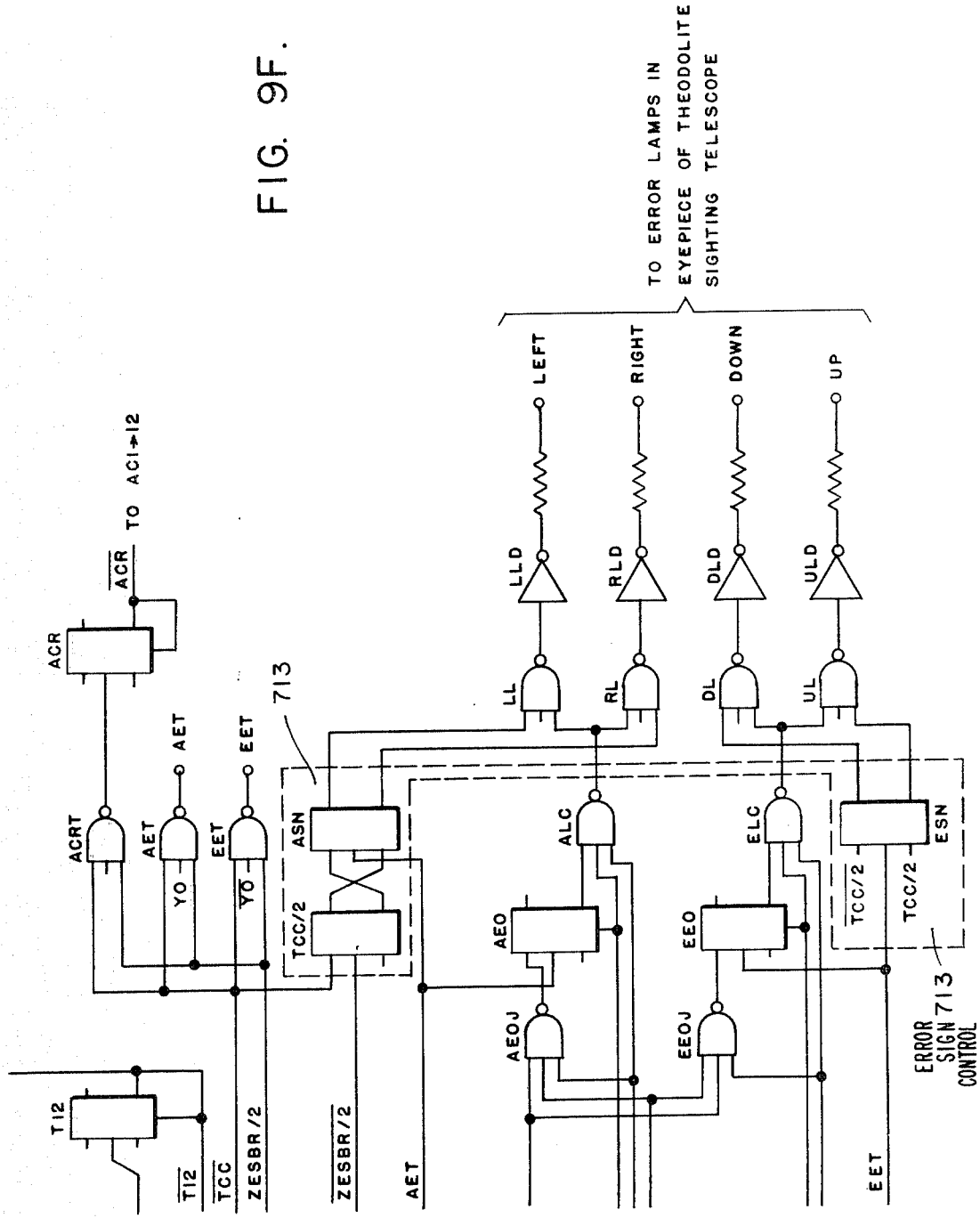

As shown by the block diagram of FIG. 7, the bursts of 1-Mc shift pulses for the accumulator and the two registers are triggered by ACS, ENS, and ZES (waveforms 51, 55, and 58 of FIG. 8); the borrow flip-flop is reset by BR (see BFR waveform 60 of FIG. 8); and the switching of the subtrahend inputs to the subtractor 704 is controlled by $\overline{ENS}$ and $\overline{ZES}$. All of these waveforms are generated by the position comparison timing circuits of Rail C.

Like the azimuth and elevation timing circuits 211, the position comparison timing circuit 210 have no function before address recognition and remain on standby (C1T and BRJ true; C1, C2, C4, C8, BR, ENS, ZES, and ACS false) as long as UA is false. When UA goes true, C1T opens and allows its $\overline{IMC}$ input to begin triggering the recycling counter made up of C1 through C8. After 11 microseconds, BRJ goes false because all its inputs are true (waveforms 36, 37, and 39 of FIG. 5) and enables BR, which is set to true by the 1-Mc clock as the counter goes to zero. BR stays true for 1 microsecond, during which time it (1) causes C1T to block one $\overline{IMC}$ pulse from the counter, and (2) resets the borrow flip-flop in the station rail to prepare the subtractor 704 for the imminent start of a comparison cycle. BR then goes back to false at the next 1-Mc shift, reopening C1T and setting ENS and ACS to true. This restarts the counter and opens the shift gates of the accumulator 703 and of the encoder register 702, initiating the first subtraction of the position comparison cycle.

After 12 microseconds, BR returns to true through the combined actions of the counter and BRJ, causing all shift gates in the position-comparison circuit to skip one clock trigger (see the $\overline{BR}$ input to ACC in FIG. 9) while again closing C1T and resetting the borrow flip-flop. Within 1 microsecond, BR is back to false, switching ZES to true and ENS to false (ACS stays true because its ENS input does not go false until after BR has changed states). With BR false and ACS and ZES true, the position-comparison circuit carries out its second subtraction during the 12 microseconds that elapse before BR goes true for the third and last time.

This third time is the last because BR now goes true while ZES is true, causing UK (zone 3H5) to reset U and UA, and thereby keeping C1T from restarting the counter. The position comparison timing circuits will then return to their standby state because as BR goes false, ENS will be kept false by the ZES feedback into its J input while ACS and ZES are triggered to the false state by $\overline{BR}$. Note that the entire comparison cycle occurs within 40 microseconds, which, fortuitously, is also the nominal duration of a single bit of the TAS message input to the synchronizer.

LOOKOUT CIRCUIT

The initial design of the J-input gating for flip-flop U did not include UB, UC, and $\overline{UC}$ (FIG. 4). These gates were added when it was found that the duration of individual TAS message bits occasionally exceeded 40 microseconds, causing B4 to stay true beyond its normal cutoff time at the end of a countdown of the bit counter (waveform 19 of FIG. 5). This in turn would cause U to go back to true and start a new transfer and timing sequence immediately after being reset by UK, because B4 and B8 would still be true and holding UJ false after the end of a comparison cycle.

A lockout circuit consisting of a trigger gate (UB) and an RS flip-flop (UC, $\overline{UC}$) was therefore added at the input of UJX to disable UJ immediately after the start of a transfer sequence. During standby, the RS flip-flop is in its normal false state ($\overline{UC}$ true) because the false U input holds UB true, and B8 is false at least part of the time. When U goes true, UB will go false while B8 is true, switching $\overline{UC}$ to false and causing it to drive UJ into the true state. UB will then go true 1 microsecond later as U turns on UA, allowing $\overline{UC}$ to go back to true whenever B8 goes false. Since B8 is also an input of UJ and does not go false until the bit counter recycles (waveforms 17 through 21 of FIG. 5), UJ must then remain true—and keep U false—until $\overline{D/1}$, X, B4, and B8 are again simultaneously true when the next positioning order is ready to be transferred.

AZIMUTH/ELEVATION SWITCHING

The mechanics and sequence of position comparison are exactly the same for both azimuth and elevation. Therefore, whenever a positioning order is transferred from the storage register 205 to the accumulator of a station rail, U, UA, and the position comparison timing circuits will operate in the same way regardless of whether the transfer is that of an azimuth or of an elevation order. However, the encoder and zeroing registers of the station rail must be loaded before each comparison cycle with either azimuth or elevation data according to the nature of the positioning order. Selection of azimuth or elevation inputs for these two registers is a function of flip-flop Y (FIG. 4), which controls all azimuth/elevation switching within the station rails.

Figure 5:
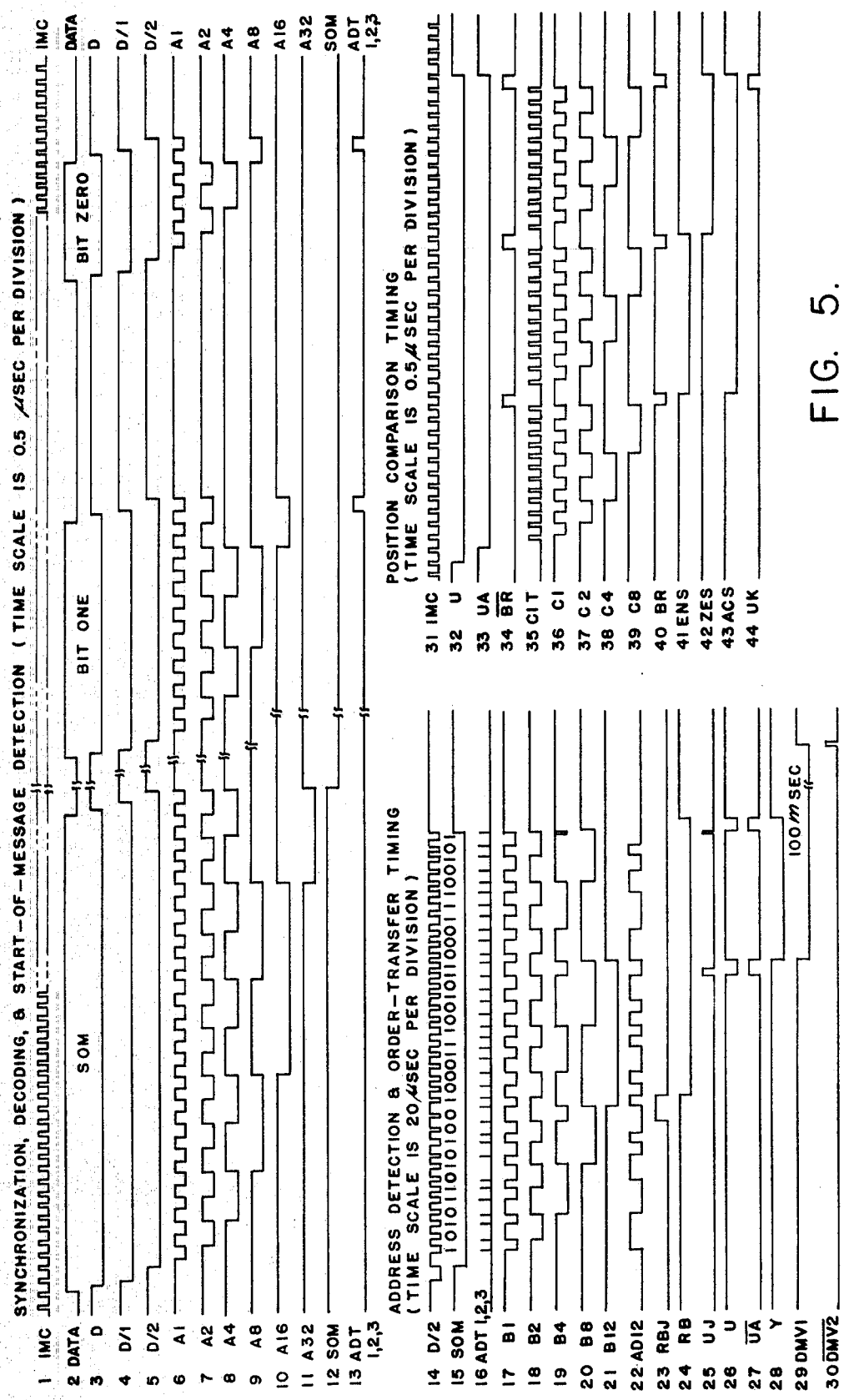
FIG. 5 illustrates the waveforms associated with FIG. 4.

As shown by waveform 28 of FIG. 5, Y is false throughout address detection and stays false until UK resets U and UA at the end of the first (azimuth) comparison cycle. It is then switched to the true state by the negative-going edge of the $\overline{UA}$ waveform, and remains true until again triggered by $\overline{UA}$ at the end of the elevation comparison cycle. As a result, Y will always be false when an azimuth order is transferred to a station rail, and always true when an elevation order is transferred. The input gates of the encoder and zeroing registers are accordingly designed to pass azimuth data when Y is false, and elevation data when Y is true. (Note that Y changes states immediately after the end of each comparison cycle, so that during error determination it will gate azimuth when true and elevation when false; the reasons for this changeover will be explained subsequently.)

BLINK CONTROL

The Blink Control circuit 212 consists of two identical one-shot multivibrators, DMV1 and DMV2 (FIG. 4). Both multivibrators have "false" stable states and both are triggered into their unstable states by a sharp negative drop at their inputs. The recovery time of DMV1 is set at 100 milliseconds and that of DMV2 at 10 microseconds by means of adjustable resistors, not shown. The DMV2 output of the circuit is therefore a positive 10-microsecond pulse occurring 100 milliseconds after Y goes true at the end of each azimuth comparison cycle (waveform 30 of FIG. 5). This output is applied to the station rails, where it is used as the "off" trigger by the circuits that cause the error lamps in the eyepieces of the theodolite sighting telescopes and the address recognition lamps on the TAS unit front panel to blink on and off at a 5-cps rate.

RESETTING THE SOM AND ADDRESS DETECTORS

After the elevation order has been transferred to the station rail, the SOM and address-recognition flip-flops must be reset in preparation for the next TAS message. The two flip-flops cannot however be reset at the same time, because SOM must be ready to detect a start-of-message pulse, which occurs immediately after the last bit of the elevation order, while the recognition flip-flop must keep the shift gates of the station rail open until the end of the elevation comparison cycle (see the RB input to ACC in 9). Accordingly, SOM is reset by SOMR(FIG. 4) when UA goes true while Y is true—that is, immediately after the transfer of an elevation order—but the recognition flip-flop stays true until reset through RCR (FIG. 4) by the same ZES and BR waveforms that reset U and UA at the end of the comparison cycle. The function of the Y input to RCR is to keep the recognition flip-flop from being reset at the end of an azimuth comparison.

SUMMARY OF EVENTS TO STATION RAIL

All acquisition messages broadcast by TAS over its UHF link consist of a start-of-message (SOM) pulse, 12 bits of address, 12 bits of azimuth order, and 12 bits of elevation order.

At each camera site, these messages are demodulated by the UHF receiver and applied to the TAS unit synchronizer 201 in pulse-duration code. In this code, the positive alternation of the SOM pulse is 40 microseconds long, and that of a bit zero is 10 microseconds long.

The synchronizer 201 synchronizes all incoming messages to the 1-Mc internal clock 202 and applies them to the acquisition message decoder 203 as a continuous pulse-coded waveform.

The decoder 203 switches the start-of-message detector 207 on whenever any positive alternation of the waveform exceeds 32 microseconds. It also generates the serial data input for the storage register 205, converting into bit ones all positive alternations that exceed 16 microseconds, and into bit zeros all positive alternations shorter than 16 microseconds.

When switched on, the start-of-message detector 207 opens the shift gates 204 and allows the synchronizer 201 to trigger the bit counter 206 and the storage register 205 at a rate equal to that of the data output of the decoder.

The message address is shifted into the storage register 205 while the bit counter counts up to 12.

The address detection circuit 208 contains four expanded gates, each parallel-connected to the storage register 205 by a group of manually preset octal switches. Each gate controls an address-recognition flip-flop, and is itself controlled by the bit counter 206. When the counter reaches a bit count of 12, each gate samples through its own group of octal switches the address that has just been shifted into the storage register 205.

If the stored address does not correspond to one of the station addresses preset into the octal switches, the address detection circuit 208 rejects it and causes the start-of-message detector 207 to switch off. This action closes the shift gates 204 and places the unit on standby until the next SOM pulse is detected.

If the stored address does correspond to one of the preset station addresses, the corresponding gate causes the address-recognition flip-flop of that station to go true and to lock the start-of-message detector 207 on. This action keeps the shift gates open and allows the azimuth and elevation orders to be shifted consecutively into the storage register 205. By going true, the address-recognition flip-flop also turns on the position-comparison and error-determination circuits of the addressed station by opening the transfer gate of the appropriate station rail.

Address recognition also causes the bit counter 206 to proceed into its second 12-bit count while the azimuth order is being shifted into the storage register 205. At the end of that count, the order is dumped out in parallel to the position-comparison circuit of the selected station rail, and the timing circuits begin to generate sequencing signals for the computation of the theodolite azimuth error.

While the azimuth order is being processed at a 1-Mc rate in the station rail, the elevation order begins shifting into the storage register 205 and the bit counter 206 proceeds into its third 12-bit count. At the end of this last count: (1) the order is dumped out to the station rail, (2) the timing circuits again generate a series of computation-sequencing signals, and (3) the start-of-message detector 207 is switched off to wait for the SOM pulse of the next message.

Figure 10:
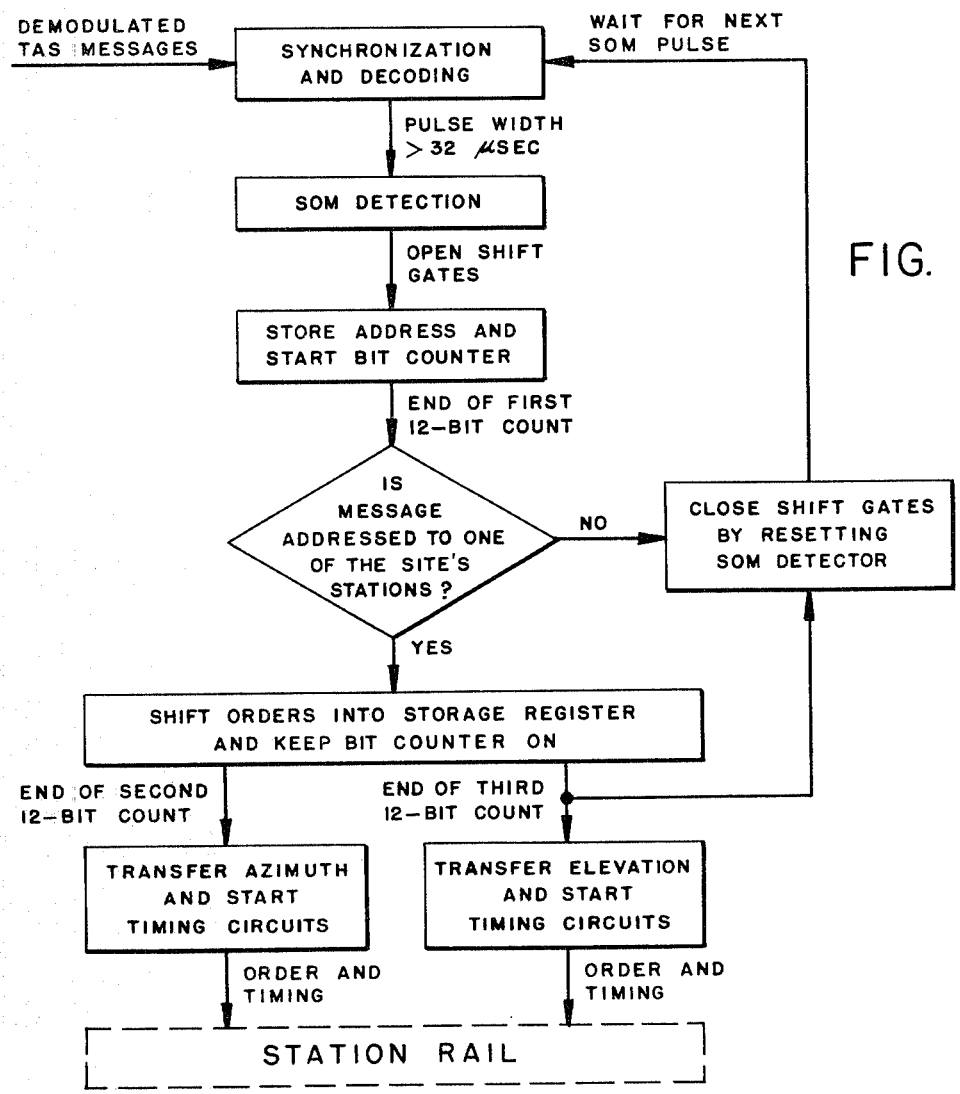
FIG. 10 is a flow diagram of events up to a station rail.
Figure 4A:
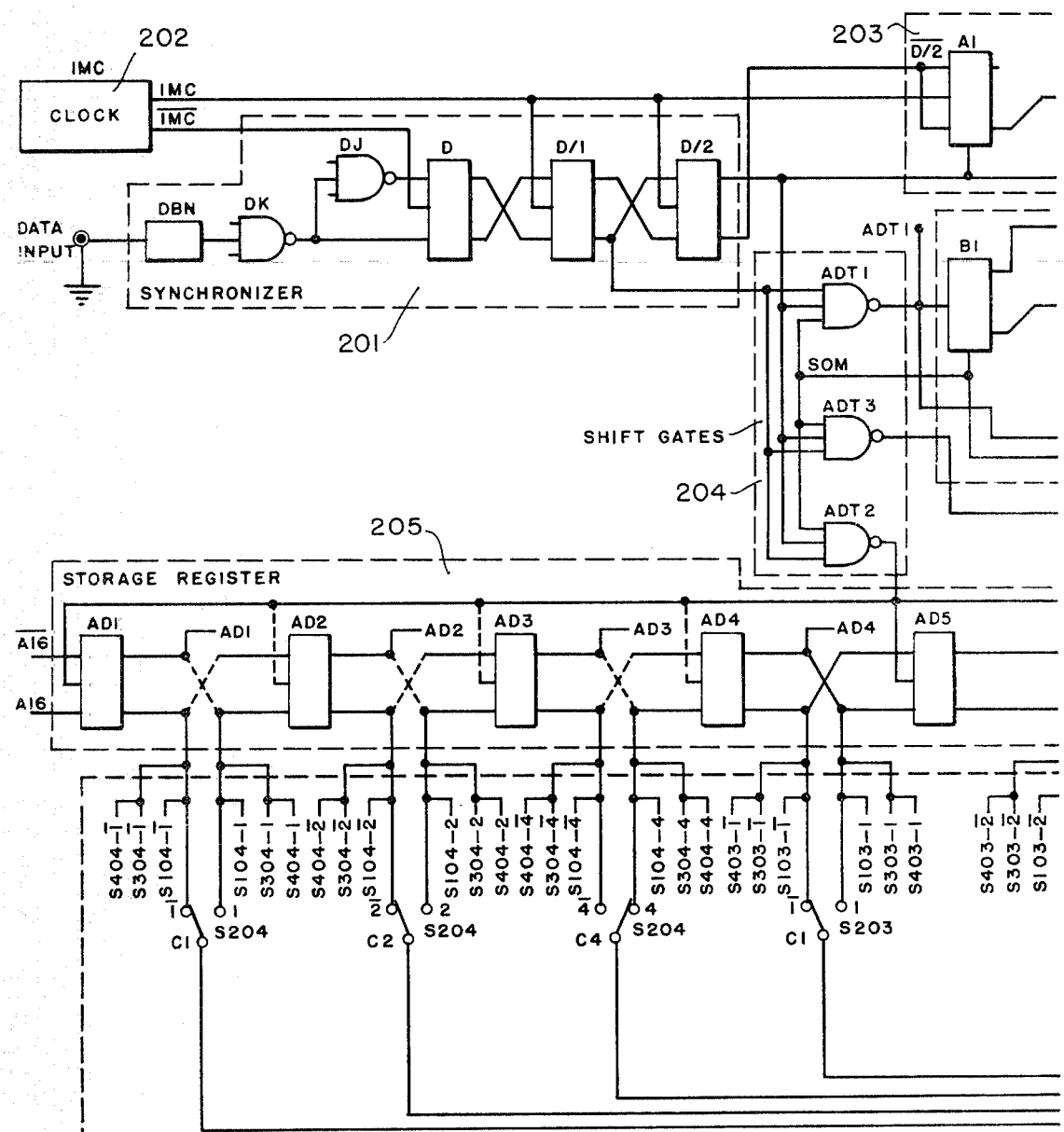
FIG. 4 is a functional diagram of the synchronization; decoding, address-detection and timing circuits.
Figure 4A:
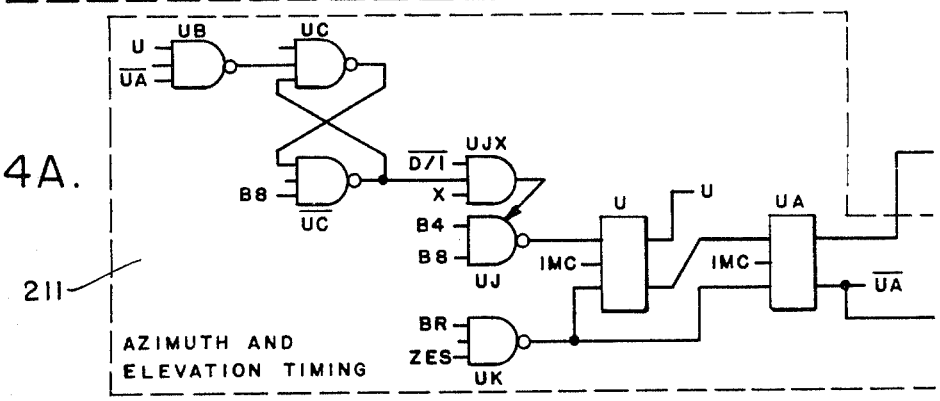
Figure 4B:
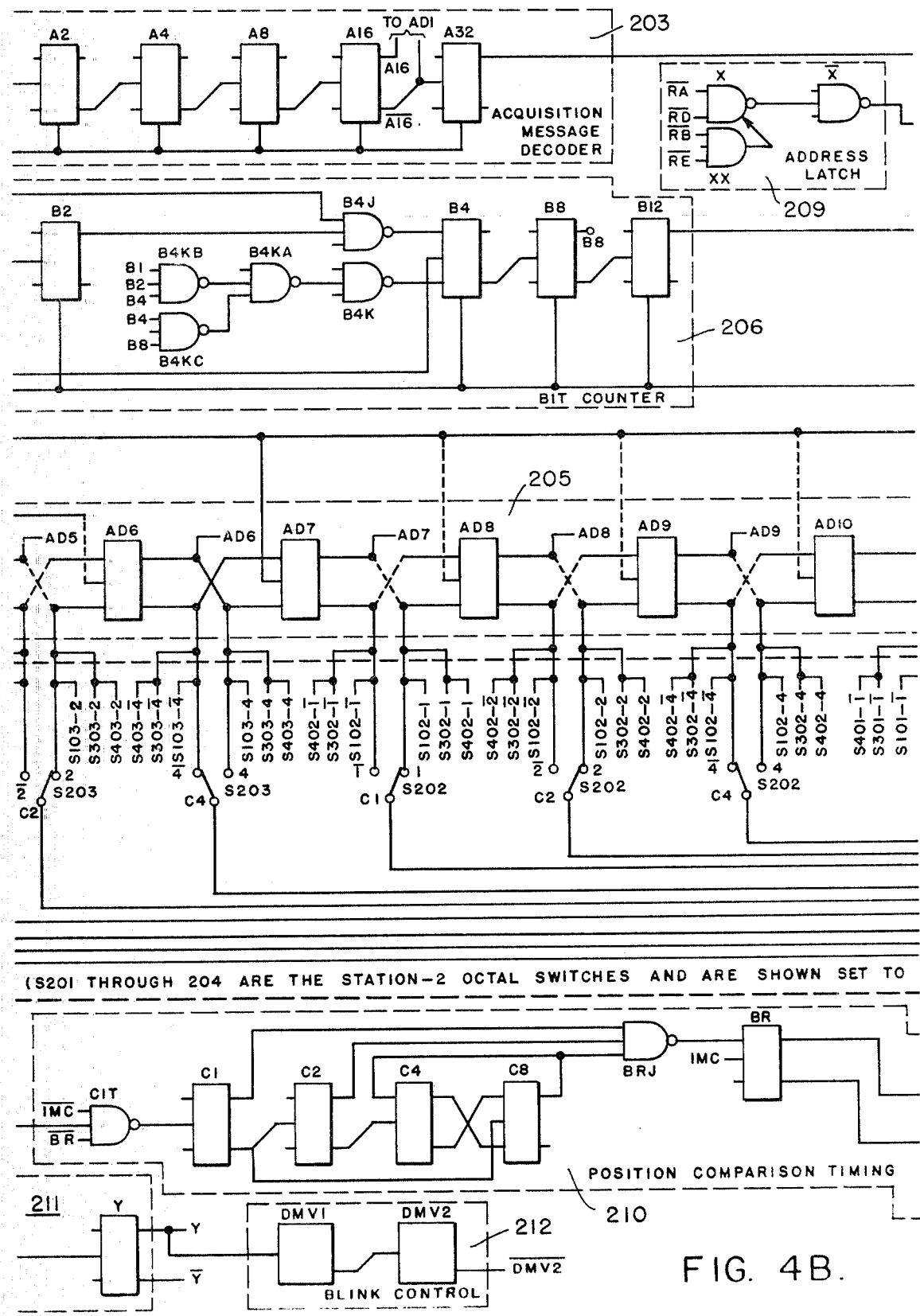
Figure 4C:
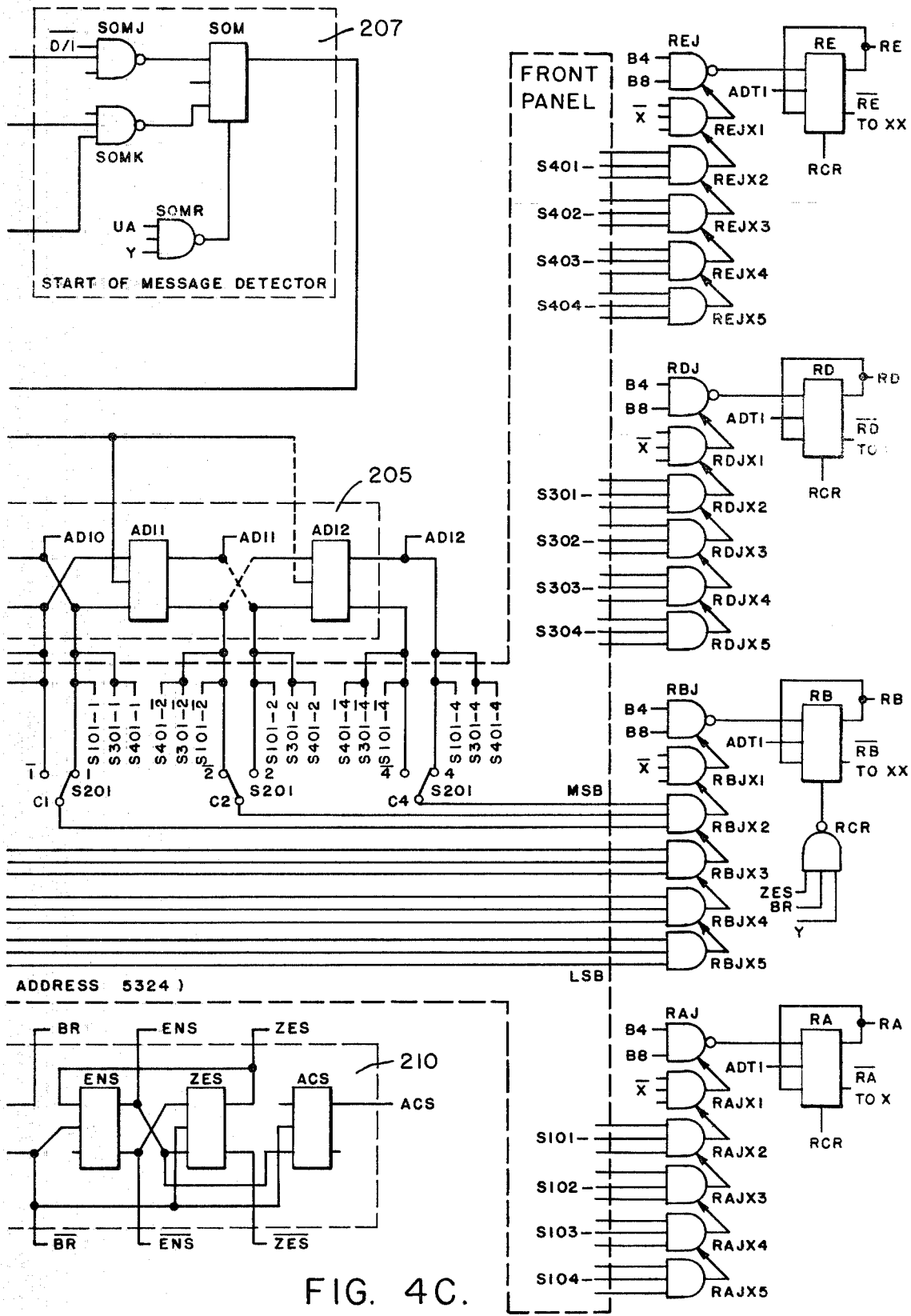

The operation of the synchronization, decoding, address-detection, and timing circuits can be summarized diagrammatically as set forth in FIG. 10.

Position Comparison and Error Determination

The position-comparison and error-determination circuits of the TAS unit are contained within one or more station rails. Unlike Rail C, whose functions are common to all the theodolite stations of a camera site, each station rail is designed to process positioning orders for only one theodolite. Therefore, a given TAS unit normally contains as many station rails as there are stations in its site, up to the four that Rail C can control and the TAS cabinet can house and interconnect. However, since all stations rails are identical and interchangeable except for two wiring connections, the following description of Rail B is equally applicable to Rails A, D, and E.

INPUTS TO RAIL B

Aside from the enabling and timing signals from Rail C, Rail B receives three data inputs: (1) azimuth and elevation positioning orders from Rail C, (2) azimuth and elevation present-position inputs from the station-2 theodolite, and (3) azimuth and elevation zeroing inputs from the TAS unit front panel. All these inputs are in the form of 12-bit binary words, with the LSB representing an angle of about 0.09° and the MSB representing 180°.

THEODOLITE DATA

The present-position inputs represent the instantaneous azimuth and elevation of the theodolite camera, as read by two digital encoders (not shown) in the camera mount. These encoders operate on TAS unit +5V power—which they receive from Rail B through the station-2 cable—but use high-level logic, so that their readings are applied to the rail at 5 volts for true and ground for false. In addition, the camera mount of a mobile theodolite may not be aligned with true north at each emplacement, and the encoders themselves are subject to misalignment and slippage in transit. Consequently, (1) the encoder readings must always be inverted before they are used in position comparisons, and (2) compensation must often be made for misalignments between the camera mount and true north, or between the mount and the encoders. Inversion of the readings occurs automatically within the position-comparison circuit; compensation for mount or encoder misalignments is provided by the zeroing inputs.

ZEROING DATA

The zeroing inputs represent the differences between the encoder readings and the true azimuth and elevation of the camera. Their values are preset manually during preoperational checks by means of two banks of toggle switches mounted on the front panel, and remain constant throughout a tracking mission. The procedures for deriving the proper zeroing values, and for setting these values into the switch banks, will be given later because they cannot be understood without a knowledge of the components and operation of the panel display circuits. For the purposes of this discussion, it is sufficient to understand (1) that any encoder reading error due to misalignment between the encoder and the camera mount, or between the mount and true north, is constant (for example, an azimuth misalignment of, say, 10°, will cause the azimuth encoder to read 350° when the camera is pointing north, 80 when the camera is pointing east, 170 when it is pointing south, etc.) and (2) that once such an error is found and measured during preoperational checks, it can be applied to the proper station rail as a constant correction factor by setting its binary value into the proper bank of zeroing switches.

INPUT AND INPUT-GATING CIRCUITS

The input circuits of Rail B comprise the Azimuth Zeroing Gates 705 (SZE12 through 1 in FIG. 9) and the Elevation Zeroing Gates 706 (RZE12 through 1 in FIG. 4), which apply the settings of the station-2 zeroing switches to the DC SET (Azimuth) and DC RESET (elevation) inputs of the Zeroing Register 201; the Azimuth and Elevation Encoder Gates 707 and 708, respectively, (SEN12 through 1 and REN12 through 1 in FIG. 9), which receive readings from the azimuth and elevation encoders of the station-2 theodolite through 24 identical noise-suppressing bias networks (ABN12 through 1 and EBN12 through 1, FIG. 9 and apply them to the DC SET and DC RESET inputs of the Encoder Register 702; and the Order Input Gates 710 (SAC12 through 1 in FIG. 9), which apply both the azimuth and the elevation positioning orders from the storage register of Rail C to the DC SET inputs of the Accumulator 703.

The changing states of the storage register flip-flops are continuously applied to the order input gates 710, but are not dumped into the accumulator 703 except during the one-microsecond periods in which transfer gate XFER (FIG. 9) is false. Similarly, the preset outputs of the zeroing switches and the changing outputs of the theodolite encoders are always present at the inputs of the zeroing and encoder gates, but the azimuth gates will open only when both XFER and Y are false (see the $\overline{Y}$ input to YO in FIG. 9 and the YO distribution through $\overline{Y1}$ and $\overline{Y2}$), while the elevation gates will open only when XFER is false and Y is true (see $\overline{YO}$ in FIG. 9 and its distribution through Y1 and Y2). As a result, order transfers will occur only when a complete positioning order has been shifted into the storage register 205, while the Y and $\overline{Y}$ inputs from Rail C will ensure that the zeroing and encoder registers are loaded with azimuth data when an azimuth order is transferred and with elevation data when an elevation order is transferred.

TRIGGER CIRCUITS

The position-comparison trigger circuits consist of control gates ACC, ENS-1, and ZES-1; inverting gates $\overline{ACC}$ and $\overline{1MC-1}$; and trigger gates ACT1 and ACT2, ENT1 and ENT2, and ZET1 and ZET2 in FIG. 9. The master gate is ACC which, through the $\overline{ACC}$ inputs to all six trigger gates, ensures (1) that a comparison cycle will not occur unless the station address has been recognized (input RB), (2) that the start and duration of the comparison cycle will be controlled by the position comparison timing circuits of Rail C (input ACS), and (3) that no trigger pulses will be generated while the borrow flip-flop of the subtractor is being reset (input $\overline{BR}$). The functions and operation of the other gates can be traced out on FIG. 9 with the aid of waveforms 50 through 59 of FIG. 8. (Disregard for the moment the $\overline{TCC}$ input to $\overline{ACC}$, which is always at ground during comparisons; its function will be described later in a discussion of the two's complement control circuit).

ENCODER/ZERO SWITCHING

The Encoder/Zero Switching circuit 709, shown as a simple SPDT switch in FIG. 7, is actually made up of eight gates: ENS-1, ZES-1, SUB1 through 4, SF, and $\overline{SF}$ of FIG. 9. Its function is to ensure that the proper subtrahend is applied to the subtractor 704 for each step of each comparison cycle (the minuend is always taken from the accumulator 703).

To exemplify, during the first (order minus encoder reading) subtraction of an azimuth comparison, ENS is true while ZES and Y are false; consequently, $\overline{ENS-1}$ and YO are false while $\overline{YO}$ and $\overline{ZES-1}$ are true, so that SUB1 is open while SUB2 through 4 are closed. SF will therefore always be in the same state as the $\overline{Q}$ side of EN1 (FIG. 9), copying the complemented reading of the azimuth encoder as it is shifted out of the encoder register 706 (the encoder words are taken from the register in complemented form to convert them from the high-level logic used by the theodolite encoders to the low-level logic of the TAS unit. As an opposite example, during the second (zeroing) subtraction of an elevation comparison cycle, $\overline{ENS-1}$ and YO will be true; $\overline{YO}$ and $\overline{ZES-1}$ will be false; SUB1, 2, and 3 will be closed; SUB4 will be open; and the state of SF will be that of the $\overline{Q}$ side of ZE1.

SUBTRACTOR

The Subtractor 704 is made up of borrow flip-flop BF and gates BFJ, BFK, BFR, DEL1 through 4, DELTA, and $\overline{DELTA}$ of FIG. 9. Its minuend inputs originate at the output stage of the accumulator 703 (AC1 in FIG. 9); its subtrahend inputs are supplied by SF and $\overline{SF}$; and its operation is controlled by the position-comparison trigger gates (waveforms 53, 56, and 59 of FIG. 8), which simultaneously shift the borrow flip-flop, the accumulator 703, and either the encoder or the zeroing register 12 times at a 1-Mc rate for each subtraction. Its output is recirculated into the accumulator 703 through ACK and ACJ (FIG. 9), so that at the end of each 12-shift burst the original (minuend) contents of the accumulator 703 will have been replaced by the remainder of the subtraction.

SUBTRACTOR ARITHMETIC

The arithmetic circuits of the TAS unit station rail are designed to work exclusively with angular measurements expressed in a closed, finite numerical system in which there are no negative numbers and the largest possible value (360°) is equivalent to zero. In the arithmetic of such a system, $359 + 1 = 0$, $350 + 50 = 40$, $90 - 180 = 270$, etc. Therefore, the design of the subtractor makes no provisions for signs or end carries; when a number is subtracted from a smaller number, the borrow function operates normally until it reaches the twelfth (MSB) bit of the minuend, then acts as if a bit one were available from a next-higher-order bin, in effect borrowing the next 360° circle:

| TAS unit subtractor | Equivalent decimal operation |
|---|---|
| 11    0    01 | |
| 100  011  100  100 | 360 + 20 deg |
| 111  100  101  000 | 341 |
| 000  110  111  100 | 39 | the result is the "two's complement" of what in the usual, infinite system of numbers would have been a negative value ($20 - 341 = -321$). The two's complement of any binary number $n$ is the number that would result if $n$ were to be subtracted from zero. In a finite, closed decimal system of 100, the ten's complement of, say, 85, would be $00 - 85 = 15$; similarly, in the TAS binary system of angle measurements, the two's complement of 111 001 000 100 (321° in TAS binary notation) is:

| | | | | |
|---|---|---|---|---|
| 000 | 000 | 000 | 000 = | 0 deg |
| 111 | 001 | 000 | 100 = | 321 |
| 000 | 110 | 111 | 100 = | 39 |

Note that, in a circle, an angular measurement of $-321°$ and one of 39° express the same direction:

[1] This is true of any angle expressed in binary notation and its two's complement. Therefore, the two's complement of any angle measured in a counterclockwise (negative) direction expresses the same angle measured in a clockwise (positive) direction.

OPERATION OF THE SUBTRACTOR

As stated previously, the subtractor 704 operates each time the trigger gates of the accumulator 703 and of either the encoder or the zeroing register generate a burst of 12 1-Mc pulses. These bursts are timed by ACC, and are always preceded by a BR pulse whose function is to clear borrow flip-flop BF through reset gate BFR. Subtraction of the LSBs occurs immediately after BF has been reset; successive subtractions then occur at a 1-Mc rate (see the ACT2 trigger at the clock input of BF) according to the following truth tables:

| Borrow Function | | | | Remainder | |
|---|---|---|---|---|---|
| minuend | | | | minuend | |
| (AC1) | 0 | 1 0 1 | | (AC1) | 0 1 0 1 0 1 0 1 |
| | | | | subtrahend | |
| | | | | (SF) | 0 0 1 1 0 0 1 1 |
| subtrahend | | | | borrow | |
| (SF) | 0 | 0 1 1 | | (BF) | 0 0 0 0 1 1 1 1 |

|     |    |       | DEL1  | 1 1 1 1 0 1 1 1 |
|-----|----|-------|-------|-----------------|
| BFJ | 1  | 1 0 1 | DEL2  | 1 1 0 1 1 1 1 1 |
| BFK | 1  | 0 1 1 | DEL3  | 1 0 1 1 1 1 1 1 |
|     |    |       | DEL4  | 1 1 1 1 1 1 1 0 |
| BF  | no | 0 1 no | DELTA | 0 1 1 0 1 0 0 1 |
|     | change | change | | |

RECIRCULATION OF THE REMAINDER

With reference to FIG. 9, assume now that the first subtraction of either an azimuth or an elevation comparison cycle is about to begin: The inputs of DEL1 through 4 will be the LSB of the positioning order (AC1, $\overline{AC1}$), the LSB of the encoder reading (SF, $\overline{SF}$), and the state of the borrow flip-flop (BF, $\overline{BF}$). As soon as BF is reset by BFR, the states of DEL1 through 4 will reflect the difference between the two LSBs, so that the result of the first operation of the subtraction will be at the J and K inputs of AC12 before the start of the trigger burst. The first trigger pulse from ACT1 will therefore shift the LSB of the remainder into AC12 as it shifts the MSB of the positioning order into AC11. Meanwhile, the second bit of the order will appear at AC1, the second bit of the encoder reading will appear at SF, the borrow flip-flop will be shifted by ACT2, and the second bit of the remainder will be at the inputs of AC12 before the second trigger pulse. This recirculation sequence will continue until the twelfth and last pulse of the trigger burst shifts the MSB of the remainder into AC12.

RECAPITULATION OF POSITION COMPARISON

Two cycles of position comparison, one for the azimuth order and one for the elevation order, occur each time a properly addressed TAS message is received. Except for the loading of either azimuth or elevation data into the encoder and zeroing registers, the two cycles are identical, each consisting of two subtractions that end with the remainder stored in the accumulator 703. The remainder of the first subtraction represents the difference between the order and the encoder reading, and is defined as the ERROR. The second subtraction compensates for encoder misalignments by subtracting a preset zeroing word from the ERROR. Its remainder—called the TRUE ERROR—represents the difference between the order and the pointing angle of the theodolite camera. Both subtractions occur within the position-comparison circuit, whose components have been described individually; this paragraph correlates those components and recapitulates their operation during a typical elevation comparison cycle.

INITIAL CONDITIONS

Before the start of an elevation comparison cycle, YO (FIG. 9) is true and $\overline{YO}$ is false because the Y flip-flop of Rail C is true; XFER and ACC are true because the U and ACS inputs are false; $\overline{IMC-1}$ (FIG. 9) is pulsing, but all trigger gates are quiescent because $\overline{ACC}$ is false; the accumulator is at zero because it has been reset by ACR (FIG. 9); and all bins of the encoder and zeroing registers are true because YO was false and $\overline{YO}$ was true while the registers were being read out serially suring the preceding azimuth comparison cycle (see the J and K inputs of ZE12 and EN12).

LOADING

Loading is controlled by transfer gate XFER (FIG. 9), which goes false for 1 microsecond immediately after the last bit of the positioning order has been shifted into the storage register of Rail C. As XFER goes false, $\overline{XFER1}$ opens the order input gates of the accumulator 703 while $\overline{XFER3}$ and $\overline{XFER5}$ open the elevation gates 708 and 706 of the encoder and zeroing registers 702 and 701, respectively. (Though $\overline{XFER2}$ and $\overline{XFER4}$ also go true at this time, the azimuth gates 707 and 705 will not open because Y1 and Y2 are held false by YO). As a result, the positioning order is transferred into the accumulator 703, the reading of the elevation encoder is dumped into the encoder register 702, and the settings of the elevation zeroing switches are read into the zeroing register 701. Note that while the positioning order is transferred without inversion (each bit is inverted twice, once in the order gate and once between the DC SET input of the storage flip-flop and its outputs), the encoder and zeroing words are complemented by being dumped into full registers through the DC RESET inputs. This automatically provides conversion from the high-level logic of the encoders to the low-level logic of the TAS unit, so the encoder elevation word is read out of the Q side of EN1 (FIG. 9); however, the zeroing word—which is coded in low-level logic—must be reinverted before being applied to the subtractor and is therefore read out of the $\overline{Q}$ side of ZE1. (During azimuth comparisons, the situation is reversed because both words are dumped without inversion into cleared registers; consequently, the azimuth zeroing word will be read out uninverted through the Q side of ZE1, and the azimuth encoder word will be complemented by being read out of the $\overline{Q}$ side of EN1.)

FIRST TRIGGER BURST

The burst of 12 1-Mc trigger pulses for the first subtraction begins after the first rundown of the comparison timing counter 210 of FIG. 2, when BR goes back to false after having reset BF and switched ACS and ENS to true. As the $\overline{BR}$ input to ACC goes true, $\overline{ACC}$ also goes true and allows ACT1, ACT2, ENT1, and ENT2 to begin triggering the accumulator 703 and the encoder register 702 at a rate set by their common $\overline{IMC-1}$ input (ZET1 and ZET2 stay closed because the $\overline{ZES}$ input is holding ZES-1 false). During the trigger burst, the contents of the accumulator 703 and of the encoder register 702 are advanced one bin at a time and fed serially out of AC1 to the subtractor 704 and out of EN1 to SUB1 and SUB2 of the encoder/zero switching circuit 709. The burst will end after 12 microseconds because at that time the comparison timing counter will again run down, setting BR momentarily true and thereby causing $\overline{ACC}$ to close the trigger gates while the borrow flip-flop is being reset.

FIRST SUBTRACTION

During the first subtraction of an elevation comparison cycle, switch gates SUB1, SUB3, and SUB4 are closed because $\overline{ENS-1}$ and $\overline{YO}$ are false. Consequently, the sole input to SF is the 1-Mc output of the Q side of EN1, which is shifted into SF through SUB2, and out of SF into $\overline{SF}$ and the subtractor 704. At the same time and rate, the Q and $\overline{Q}$ outputs of AC1 are shifted into the subtractor 704; the remainder is recirculated into the accumulator 703 through ACK and ACJ; and the encoder register 702 is progressively cleared by the YO and $\overline{YO}$ inputs to EN12. At the end of the trigger burst, the accumulator 703 will contain the ERROR difference between the order and the encoder reading, and the encoder register 702 will be in the proper (cleared) standby condition for an input from the azimuth encoder during reception of the next TAS message.

SECOND TRIGGER BURST AND SUBTRACTION

The 1-microsecond interval between the first and the second trigger bursts (see waveform 53 of FIG. 8) is caused by BR, which drives ACC true and $\overline{ACC}$ consequently false as it resets the borrow flip-flop. During that interval, BR also causes ENS and ZES to change states, so that when the $\overline{BR}$ input to ACC goes back to true, ACS will still be true, but ENS will be false and ZES will be true. This combination of inputs will (1) allow ACT1 and ACT2 to resume triggering the accumulator 703, (2) cause ZET1 and ZET2 to start triggering the accumulator 701, (3) keep ENT1 and ENT2 from triggering the encoding register 702, and (4) enable SUB4 through $\overline{ENS-1}$ while causing $\overline{ZES-1}$ to disable SUB2 (SUB1 and SUB3 are disabled throughout the elevation comparison ENS by their false $\overline{YO}$ inputs). Therefore, during the second trigger burst the subtractor 704 will receive the ERROR as a minuend from the Q and $\overline{Q}$ sides of AC1, and the zeroing word as a subtrahend from the $\overline{Q}$ side of ZE1 through SUB4, SF, and $\overline{SF}$. After 12 shifts, the TRUE ERROR remainder of the subtraction will have been recirculated into the accumulator 703; the zeroing register 701 will have been cleared by the YO and $\overline{YO}$ inputs to ZE12; the comparison timing counter 210 will have run down for the third and last time; and BR will again go momentarily true, ending the trigger burst, the subtraction, and the comparison cycle.

TRUE ERROR

Figure 11:
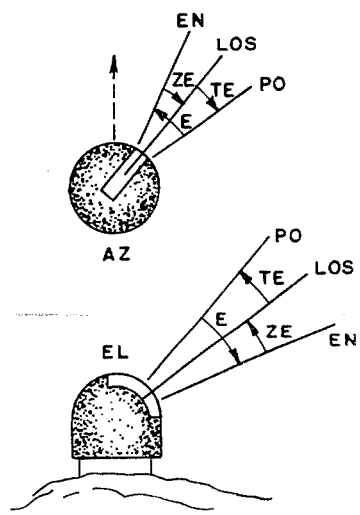
FIGS. 11 and 12 illustrate the computation of TRUE ERROR.
Figure 12:
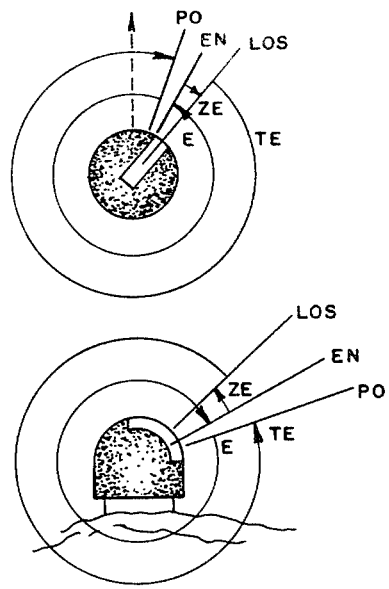

The TRUE ERROR result of a position comparison cycle is an angular measurement representing, in either the azimuth or the elevation plane, the difference between a positioning order and the camera line of sight. This difference is expressed as a RIGHT or UP error, that is, an error that the operator would correct by traversing the camera mount to his right or by tilting it upward. For example, given—in either azimuth or elevation—a camera line-of-sight angle (LOS) of 39°, an encoder misalignment of 13°, a resultant encoder reading of 26°, and an order of 52°, the position-comparison circuit would compute the TRUE ERROR as shown in FIG. 11. In this case, the magnitude of the TRUE ERROR shows that the target is slightly to the right of or above the LOS, and could be converted immediately into the proper RIGHT or UP signal for the theodolite operator; but consider now the TRUE ERROR resulting from an acquisition order for a target that is to the left of or below the LOS as shown in FIG. 12. That would be a long way to have to go in azimuth, and an impossible one in elevation. The logic circuitry of the station rail therefore includes a right-to-left and up-to-down error conversion circuit that automatically converts into LEFT or DOWN error angles all true errors of 180° or more.

ERROR CONVERSION CIRCUIT

The error conversion circuit comprises the Two's Complement 711, the Two's Complement Control 712, and the Error Sign Control 713. Its functions are (1) to monitor the magnitude of the TRUE ERROR result of each position comparison cycle, (2) to convert all true errors whose magnitudes exceed 180° into equivalent LEFT or DOWN error angles, (3) to trigger the Lamp Controls 714, 715 and 716 of the error-determination circuit whenever a valid error angle is stored in the accumulator, and (4) to switch the outputs of the Azimuth and Elevation Channels 714 and 718, respectively, of the Error-Determination circuit into the proper error lamp of the Sighting Telescope Eyepiece.

As indicated in the previous paragraph, the circuit also converts into a LEFT or DOWN error angle any TRUE ERROR whose magnitude is exactly 180°. This unnecessary operation was included because it allowed the design of a greatly simplified two's complement control.

TWO'S COMPLEMENT CONTROL

The Two's Complement Control is made up of a start circuit (ZESBR and POL), a control flip-flop (TCC), and a 2-microsecond delay circuit (1MC-1, ZESBR/1, and ZESBR/2 in FIG. 9). The sole function of POL is to keep ZESBR from going false at the end of a comparison cycle performed by another rail (the ZES and BR outputs of Rail C are applied to all station rails whenever any rail is performing position comparisons). The function of ZESBR is twofold: (1) it causes TCC to test the magnitude of the TRUE ERROR immediately after the end of the comparison cycle, and (2) it starts a two-microsecond rundown that, unless overridden by TCC, will end the enabling of the error determination circuit. The purpose of the two-microsecond delay is to allow TCC to test the TRUE ERROR and—if conversion is needed—to disable ACRT, AET, and EET (FIG. 9) before they are triggered by ZESBR/2.

Need for conversion is ascertained by testing the state of AC12 at the end of the comparison cycle. At that time, AC12 contains the MSB of the TRUE ERROR, and is therefore false if the magnitude of TRUE ERROR is smaller than 180°, true if it is 180° or larger. If AC12 is true, conversion will be needed and TCC will go true to initiate a two's complement cycle; if it is false, TCC will stay false, the two's complement will not turn on, the error sign will be positive (RIGHT or UP), and error determination will begin when ZESBR/2 goes true. Since the operation of the error-determination circuit will eventually be the same regardless of whether the TRUE ERROR is converted or not, let us first consider the mechanics and circuitry of error conversion.

METHOD OF CONVERSION

The error conversion circuit transforms RIGHT or UP true errors of 180° or more into equivalent LEFT or DOWN error angles by converting them into their two's complements. The rational basis for this method of reversing the direction of binary angular measurements is the same as that given in the description of subtractor arithmetic, but the logical implementation is somewhat different because it is founded on the following rule:

To transform a binary number into its two's complement, start with the LSB and copy all digits up to and including the first bit one, then complement the rest.

By this rule, a RIGHT true error of 315°: 111 000 000 000 is converted to a LEFT error angle of 45°: 001 000 000 000

A maximum UP count of 359.91°: 111 111 111 111 will become a minimum DOWN count of 0.09°: 000 000 000 001

And an angle of 180°: 100 000 000 000 will remain at 180°: 100 000 000 000
even when its direction is changed from RIGHT to LEFT or from UP to DOWN.

The numerical conversion is carried out within the Two's Complement circuit 711, which consists of a start gate (TCT), a 12-bit counter (T1 through T12), a flip-flop switch (TC), and two output gates (TCN and TCJ of FIG. 9). The right-to-left and up-to-down conversions are made at the outputs of the error-determination circuit by the Error Sign Control 713, which consists of flip-flops TCC/2, ASN, and ESN (FIG. 9).

STARTING THE CONVERSION CYCLE

At the end of the second subtraction of each position comparison cycle, the TRUE ERROR is stored in the accumulator 703, POL is true because it was dc-set by XFER during data transfer, and BR goes true while ZES is true. These conditions cause ZESBR to enable ZESBR/1 and to trigger TCC. If the magnitude of TRUE ERROR is 180° or more, the $\overline{AC12}$ input to TCC will be false and TCC will be driven true as ZESBR goes false. By going true, TCC will (with reference to FIG. 9):

1. Close ACRT, AET, and EET, thereby keeping ZESBR/2 from resetting the accumulator 703 and from triggering the error-determination circuit 717 or 718.
2. Enable TCC/2, thereby causing it to enable the J and K inputs of ASN and ESN when ZESBR/2 goes true.
3. Drive $\overline{DELTA}$ true, thereby isolating ACK from the subtractor 704.
4. Drive $\overline{ACC}$ true, thereby allowing $\overline{1MC\text{-}1}$ to start shifting the accumulator 703 through ACT1 and ACT2.
5. Enable TCT, thereby allowing $\overline{1MC\text{-}1}$ to start triggering TC and T1 at the rate at which the TRUE ERROR is being shifted into TCN and TCJ from AC1.
6. Ground the TCC input of TCN and TCJ, thereby allowing TC to determine whether each individual bit of the TRUE ERROR will be applied to ACK through TCN or TCJ.

ERROR CONVERSION

At the start of the conversion cycle, TC is in its standby (false) state, TCN is consequently locked true, and the state of TCJ is controlled by—and the inverse of—the state of AC1. The first shift of the cycle will therefore cause ACK and ACJ to recirculate the LSB of the TRUE ERROR into AC12 without inversion, regardless of whether it is a bit zero or a bit one:

|  | AC1 | TC | TCN | TCJ | ACK | ACJ | AC12 |
|---|---|---|---|---|---|---|---|
| BIT ZERO | 0 | 0 | 1 | 1 | 0 | 1 | 0 |
| BIT ONE | 1 | 0 | 1 | 0 | 1 | 0 | 1 |

This non-inverting recirculation will continue bit by bit as long as TC stays false. Note, however, that the output of TCJ is also applied to the J input of TC, and that TC is triggered by TCT each time a bit is advanced through the circuit. The first bit one out of the accumulator will therefore cause TC to go true as it is shifted into AC12. TC will then lock up through an internal feedback, locking TCJ true, opening TCN, and thereby causing each subsequent bit to be inverted as it is transferred from AC1 to AC12:

|  | AC1 | TC | TCN | TCJ | ACK | ACJ | AC12 |
|---|---|---|---|---|---|---|---|
| BIT ZERO | 0 | 1 | 0 | 1 | 1 | 0 | 1 |
| BIT ONE | 1 | 1 | 1 | 1 | 0 | 1 | 0 |

As a result, the TRUE ERROR will be returned to the accumulator 703 unchanged up to and including the first bit one, then complemented for each following bit. This fulfills the requirements of the two's complement transformation rule given previously, and effectively converts the TRUE ERROR into an equivalent error angle measured in the opposite direction.

ENDING THE CONVERSION CYCLE AND RESETTING THE ACCUMULATOR

The 1-Mc pulse outputs of TCT that trigger TC during error conversion also shift the 12-bit counter made up of flip-flops T1 through T12 (FIG. 9). These outputs are synchronized to those of ACT1 and ACT2, so that T12 goes momentarily true as the twelfth (MSB) bit of the error angle is shifted into AC12. As it goes true, T12 will (1) reset TCC, thereby ending the conversion cycle by disabling TCT, ACT1, and ACT2; (2) return TC to its standby condition; and (3) dc-set ZESBR/1 to true.

The next clock pulse from 1MC-1 will then drive ZESBR/2 momentarily true and—since TCC is now false—cause it to trigger ACR through ACRT and to enable either the azimuth (AET) or the elevation (EET) trigger gate of the error-determination circuit. Consequently, the error angle will be read out in parallel from the accumulator 703 into either the azimuth or the elevation channel 717 or 718, respectively, of the error-determination circuit during the turn-on time of ACR (about 200 nanoseconds). ACR will then go momentarily true to clear the accumulator 703, and immediately reset itself through the feedback shown.

ERROR-ANGLE TRANSFER

Error-angle transfer and accumulator reset occur whenever ZESBR/2 goes true while TCC is false. This condition may exist either 2 microseconds after ZESBR goes false at the end of a position comparison cycle that yields a TRUE ERROR of less than 180°, or 1 microsecond after T12 goes true at the end of an error conversion cycle. In either case, the operation of AET, EET, ACRT, and ACR will be the same, and the error angle stored in the accumulator 703 will be applied to three Lamp Controls in either the azimuth or the elevation channel of the error-determination circuit. (Note, in passing, that the YO and $\overline{YO}$ inputs to AET and EET are the complements of the AZ/EL gating waveforms used during position comparisons. This is because the Y flip-flop of Rail C changes states immediately after the end of each comparison cycle; see waveform 49 of FIG. 8).

FUNCTION OF THE ERROR-DETERMINATION CIRCUIT

When applied to the error-determination circuit, the error angle represents, in either the azimuth or the elevation plane, the shortest angular distance between the positioning order and the pointing angle of the theodolite camera. This distance is expressed as a binary angle measurement with an accuracy of ±0.09°. Such accuracy is beyond the capacity of the sighting telescope error-display equipment, which consists of four eyepiece lamps and is intended to give the theodolite operator only (1) the direction in which the camera is to be moved, and (2) a very rough indication of the amount of movement needed to bring the target into his field of view. Selection of the eyepiece lamp to which the error indication is to be applied is a function of the AZ/EL gating circuitry and of the Error Sign Control 713. The function of the error-determination circuit is to drive the selected lamp in one of four standard modes: (1) steady-on when the error angle is larger than or equal to 45°, (2) blinking at a 5-cps rate when the error angle is smaller than 45° but larger than or equal to 1.4°, (3) blinking at a 2.5-cps rate when the error angle is smaller than 1.4° but larger than zero, and (4) off when the error angle is zero.

COMPONENTS OF THE ERROR-DETERMINATION CIRCUIT

The error-determination circuit is made up of three input gates (E45J, E1.4J, and EO), two input inverters (E45K and E1.4K), and two identical lamp control channels, one for azimuth and one for elevation. The azimuth channel comprises three flip-flops (AE45, AE1.4, and AEO), AEO-enable gate AEOJ, and output gate ALC. The equivalent components of the elevation channel are EE45, EE1.4, EEO, EEOJ, and ELC.

The input gates, which are common to both channels, are connected to the $\overline{Q}$ sides of the 12 flip-flops of the accumulator 703 in such a way that E45J will be true when any of the three highest-order bins of the accumulator are true, E1.4J will be true when any of the next five bins are true, and EO will be true when any of the four lowest-order bins are true. All three gates may be true simultaneously—as, for example, when a quantity such as 48.5° (45° + 2.8° + 0.7°) is stored in the accumulator—and all three will be false whenever the accumulator is at zero.

The two lamp control channels are in constant, direct control of the error lamps in the sighting telescope eyepiece. To illustrate, the switching circuit of ESN, UL, and DL at the output of the elevation channel serves only to route the output of ELC to either the UP or the DOWN error lamp; the state of the selected lamp will depend entirely on that of ELC, and the lamp will be on whenever ELC is true, off whenever ELC is false. (That, incidentally, is why the error-determination circuit has two lamp control channels, rather than a single time-shared one, even though the error-angle input of either channel is updated at the relatively low 5-cps rate of the TAS message input.)

The azimuth channel 717 is triggered by AET when an azimuth error angle is in the accumulator; the elevation channel 718 is triggered by EET when an elevation error angle is in the accumulator. Aside from this difference in trigger gates and updating times, the operation of the two channels is identical. The following description of the azimuth channel is therefore equally applicable to the elevation channel in all but component nomenclature.

OPERATION OF THE LAMP CONTROL CHANNEL

The lamp control channel has four stable states and no "standby" condition. Each stable state represents one of four ranges of error-angle magnitude (no error, less than 1.4°, 1.4° to less than 45°, 45° or more) and drives the selected error lamp in one of four modes (off, blinking at 2.5 cps, blinking at 5 cps, steady-on). At any given time, the state of the channel reflects the magnitude of the latest error-angle input, and can change only when the channel is triggered by AET. Upon being triggered, the channel samples the newly computed error angle through the input gates and changes state if the error-angle magnitude has moved into a different range. The operation of the channel for each of the four magnitude ranges is summarized below.

ZERO ERROR

When the error angle is zero, E45J, E1.4J, and EO are false. AE45 and AE1.4 will consequently go true, but AEOJ will drive AEO false. All inputs to ALC will therefore be true and ALC will go false, keeping or driving the error lamp out.

1.4°>ERROR >0° . When the error angle is smaller than 1.4° but larger than zero, E45J and E1.4J are false, EO is true. All three flip-flops are therefore true, and the $\bar{Q}$ side of AEO will hold ALC true. At the next AET trigger, if the error angle is still in the same range, AEO (with no K input) will go false, driving ALC false. As long as the error stays in the same range, AEO will toggle at each trigger and ALC will switch the error lamp on and off at a 2.5-cps rate.

45°> ERROR  1.4° . When the error angle is smaller than 45° but larger than or equal to 1.4°, E45J is false, E1.4J is true, and the state of EO is immaterial because AE1.4 will keep AEO reset. With E1.4J true, AE1.4 is false and ALC is true until the $\overline{DMV2}$ DC-SET input of AE1.4 goes momentarily false, driving AE1.4 true and ALC false. The error lamp will therefore blink each time AET triggers the lamp control channel (that is, at a 5-cps rate) as long as the error angle stays in the <45°,  1.4° range.

ERROR  45°

When the error angle is larger than or equal to 45°, E45J is true and the state of the other two input gates is immaterial because AE45 will go false, driving ALC true. The error lamp will therefore be on continuously as long as AE45 stays false.

ERROR SIGN CONTROL AND OUTPUT CIRCUITS

The outputs of the azimuth and elevation lamp control channels are applied to switch gates LL, RL, DL, and UL (FIG. 9). These gates are controlled by ASN and ESN, which with TCC/2 make up the Error Sign Control 713 of the error conversion circuit. The function of the error sign control is to switch the outputs of the lamp control channels into LL or DL when the error angle is the two's complement of the TRUE ERROR, and into RL or UL when the error angle and the TRUE ERROR are one and the same.

TCC/2 is enabled by the $\bar{Q}$ side of TCC and triggered by the $\bar{Q}$ side of ZESBR/2. It will therefore stay false when the TRUE ERROR is smaller than 180°, and go true when it is 180° or larger. Subsequently, when AET or EET trigger one of the lamp control channels, ASN or ESN will automatically assume the state of RCC/2 and route the output of the channel to the proper error lamp of the sighting telescope eyepiece. For example, after an azimuth comparison cycle that ends with a TRUE ERROR of 300° stored in the accumulator 703, TCC and TCC/2 will go true, the TRUE ERROR will be converted to a left error angle of 60°, AET will trigger ASN to true, RL will be disabled by the $\bar{Q}$ side of ASN, and the output of the lamp control channel will be routed through LL and LLD to the LEFT error lamp. Conversely, a TRUE ERROR of less than 180° will leave TCC and TCC/2 false; the AET trigger will then leave ASN false, and the output of ALC will be routed through RL and RLD to the RIGHT error lamp.

LLD, RLD, DLD, and ULD are identical two-stage inverter-drivers whose output stage conducts whenever the base of the input stage is driven false. The output stage of each driver draws current from the rails's +10V source through a dropping resistor, the station cabling, and one of the error lamps in the sighting telescope eyepiece. The function of the dropping resistor is to limit current through the eyepiece lamp to about 180 milliampers.

SUMMARY OF EVENTS REGARDING POSITION COMPARISON AND ERROR DETERMINATION

1. A TAS unit has as many station rails as there are theodolite stations in the camera site served by that unit. All station rails are identical except for two wire connections, and operate in the same manner.

2. All positioning orders addressed to any station of the site are applied to all station rails, but only the rail of the addressed station is enabled to process them. The positioning orders for any one station are zero-referenced to the geographic location of its theodolite and represent the azimuth and elevation of the designated target. They are updated and repeated at a 5-cps rate, and consist of a 12-bit binary word for azimuth followed by a 12-bit binary word for elevation.

3. Each station rail receives four other inputs, two from its own theodolite and two from its own banks of zeroing switches on the front panel. The inputs from the theodolite represent the changing azimuth and elevation of the theodolite camera, as read by encoders in the camera mount. The zeroing inputs are preset and represent the differences between the encoder readings and the true azimuth and elevation of the camera. All four inputs are in the 12-bit binary format of the positioning orders.

4. The positioning orders are transferred into the station rail at a 5-cps rate. The azimuth order is transferred first, and is completely processed at a 1-Mc rate before the transfer of the elevation order. Transfer of either order causes the related encoder and zeroing words to be dumped into the rail, and is automatically followed by activation of the position-comparison circuit.

Figure 13:
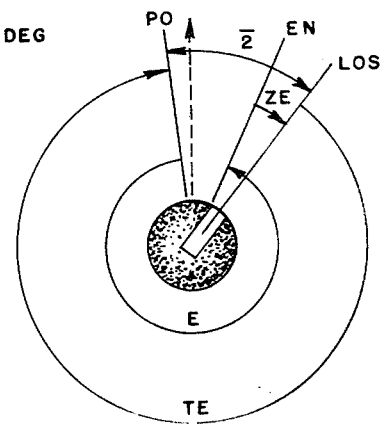
FIG. 13 illustrates the sequence of operations involved in deriving a left or down error angle from a positioning order.

5. The position-comparison circuit subtracts the encoder reading from the positioning order to obtain the ERROR, then subtracts the zeroing word from the ERROR to obtain the TRUE ERROR. The TRUE ERROR is an accurate measurement of the angle through which the camera must traverse in a right or up direction to intercept the target. If that angle is smaller than 180°, it will be applied immediately to the error-determination circuit as the error angle for the theodolite operator; if it is 180° or more, it will be converted by the two's complement circuit into an equivalent left or down error angle before being applied to the error-determination circuit. The sequence of operations involved in deriving a left or down error angle from a positioning order is illustrated by the example shown in FIG. 13.

6. The error-determination circuit converts the error angle into DC or square-wave signals that are used to drive the lamps of the sighting telescope eyepiece in one of four standard modes: (1) steady-on when the error angle is larger than or equal to 45°, (2) blinking at a 5-cps rate when the error angle is smaller than 45° but larger than or equal to 1.4°, (3) blinking at a 2.5-cps rate when the error angle is smaller than 1.4° but larger than 0°, and (4) off when the error angle is zero.

7. The outputs of the error-determination circuit indicate the magnitude range but not the direction of the error angle. Direction is supplied by the error sign control, an electronic switch that routes the error indication to the LEFT or DOWN eyepiece lamp when the error angle is the two's complement of the TRUE ERROR, and to the RIGHT or UP lamp when the error angle and the TRUE ERROR are one and the same.

Figures 14, 15:
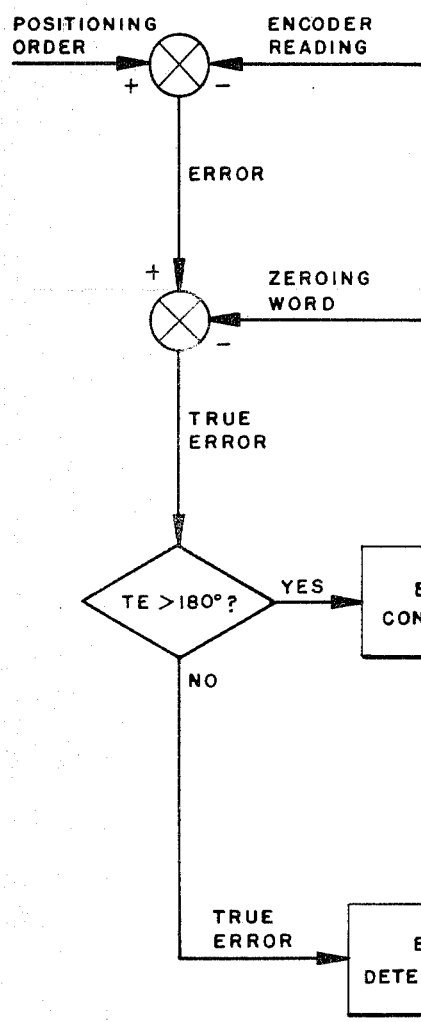
FIG. 14 is a flow diagram of events taking place in a station rail.
FIG. 15 illustrates zeroing the theodolite.

8. The successive operations of the station rail in deriving an azimuth error indication from an azimuth positioning order can be summarized diagrammatically as shown in FIG. 14.

ZEROING CIRCUITS

The zeroing circuits provide a fast, simple means of compensating for differences between the readings of the theodolite encoders and the true azimuth and elevation of the camera. They make periodic realignment of the encoders unnecessary and, when the TAS unit is used with a mobile theodolite, eliminate all need for north-alignment of the camera mount after each move. A separate zeroing circuit, consisting of a 12-bit register and 24 input gates in the proper station rail and 24 toggle switches on the front panel, is provided for each theodolite station. The functions and operation of the zeroing register 701 and its input gates 705 and 706 have been discussed previously. The zeroing switches and their use in compensating for encoder misalignments are described below.

ZEROING SWITCHES

The TAS unit front panel contains four identical groups of zeroing switches, one for each of the four stations that the unit is designed to serve. Each group consists of two rows of 12 two-position microswitches, the upper row for azimuth and the lower row for elevation, and is wired to the zeroing gates of its station rail through one of four rail-to-panel connecting cards, not shown. The switches of each row can be set to generate any value between 0° and 359.91°, in a 12-bit binary format identical to that of the order and encoder words. The outputs of each row, taken in parallel, make up one of the two zeroing words that are alternately dumped into the zeroing register 701 at the start of each position comparison cycle. FIG. 9 shows the azimuth and the elevation rows of zeroing switches 720 and 721, respectively, for station 2, both set at an arbitrary test value of 127.52°.

ZEROING THE THEODOLITE

Assume now that a mobile theodolite and its TAS unit have just been moved into position. The theodolite must be leveled, and its exact geographic location must be known to the range control central, but no attempt need be made to collimate the encoders or to north align the camera mount. After establishing radio contact with the range control central, the theodolite operator sights and locks the theodolite manually onto any range reference point, then asks range control to send him acquisition messages for that reference point. On the TAS Unit front panel, he checks that the address recognition (not shown) for his station is blinking, sets all of his station's zeroing switches to off (down), then turns the station selector (not shown) to his assigned station number and the test switch (not shown) to AZ TRUE ERROR: The test lamps (not shown) will automatically show him the difference between the reading of the azimuth encoder and the true azimuth of the camera because (1) the camera is locked onto the point that it is being ordered to acquire, and (2) by setting all zeroing switches to off he has removed all inputs from the zeroing register, so that the ERROR and TRUE ERROR outputs of the position-comparison subtractor will be the same. For example, FIG. 14 illustrates the case where the true azimuth to the reference point is 200° but the azimuth encoder reads 71°. The operator now sets the azimuth zeroing switch 720 directly over (for stations 1 and 3) or under (for stations 2 and 4) each lighted test lamp to true (up). The contents of the zeroing register during all succeeding azimuth comparison cycles will then be 010 110 111 100; the TRUE ERROR will be 010 110 111 100 − 010 110 111 100 = 0; and all 12 test lamps will be out, indicating that exact compensation has been made for the theodolite misalignment in azimuth.

All the operator had to do to zero the theodolite in azimuth was (1) turn two rotary switches, (2) see which of the test lamps would light, and (3) set the corresponding azimuth zeroing switches to the up position. To zero the theodolite in elevation, he will turn the test switch to EL TRUE ERROR, look at the test lamps—which will now display the amount by which the elevation encoder is out of alignment—then set to the up position all the elevation zeroing switches 721 for his station that are directly above or below a lighted test lamp.

In azimuth, this procedure automatically compensates for both mount misalignments and encoder maladjustments because the encoder reading, if wrong, will lag or lead the true azimuth of the camera by a constant amount regardless of pointing angle. In elevation, the zeroing switches can compensate for encoder maladjustments, but not for inaccurate leveling of the theodolite. This is because errors induced by inaccurate leveling vary with azimuth, so that any zeroing correction made with the camera pointed in one direction will actually double the error in the opposite direction.

TAS Unit Logic Elements

The electronics portion of the TAS unit is built with Abacus I-series card modules utilizing Signetics Utilogic integrated circuits. The basic logic elements of the unit are the NAND gate and the J-K flip-flop, and operate at a true level of ground and a false level of +5 volts.

NAND GATES

Most of the decisional operations of the unit are implemented with three-input NAND gates mounted on IN-12S cards. The outputs of these gates are false when all three inputs are simultaneously true, true whenever any of the inputs are false. With two of their three inputs grounded, these gates are also widely used as inverters.

Decisional operations that require more than three input operands are implemented with seven-input or expandable NAND gates. The seven-input NAND gates are mounted on IN-6S cards and differ from the IN-12S gates only in the number of input stages. Grounding of one or more of their inputs automatically converts the seven-input gates into six-, five-, or four-input NANDs.

The expandable NAND gates are mounted on IN-12AS cards. The expanders for these gates consist essentially of the input circuits of a three-input NAND gate, and are mounted on IN-12AS or IG-12S cards. The three emitters of each gate expander are connected in parallel to its output pin, so that when that pin is wired to the expansion input of an expandable NAND, the expandable gate is effectively converted into a five-input NAND. More than one expander can be wired to the expansion input of an expandable gate (see, for example, the 15-input NAND assemblies in FIG. 9, REJ, RDJ, KBJ and RAJ).

In the TAS unit, all unused NAND-gate and expander inputs are grounded. (In the function diagrams, ground symbols are not shown at unused gate inputs to avoid cluttering an already crowded drawing; however, all gate input lines not shown terminated either by the output of another element or by a functional-nomenclature designator should be understood to be grounded.)

FLIP-FLOPS

All storage and memory functions of the unit are implemented with Utilogic J-K flip-flops. The $\bar{J}$ and $\bar{K}$ inputs of this flip-flop are clocked by the C input, the $\overline{DS}$ and $\overline{DR}$ inputs are not. The flip-flop can therefore be dc-set to either state at any time by appropriate voltage levels at its $\overline{DS}$ and $\overline{DR}$ inputs, but will react to the levels of its $\bar{J}$ and $\bar{K}$ inputs only when the clock waveform goes first positive to load the master (input) circuit, then negative to transfer the state of the master circuit to the slave (output) circuit. In the TAS unit, unused $\overline{DS}$ and $\overline{DR}$ inputs are grounded (constantly true), and unused $\bar{J}$ and $\bar{K}$ inputs are left unconnected (constantly false).

All J-K flip-flops used for single-bit storage or for counters are mounted on IF-6S cards; those used for registers are mounted on IS-2S cards. The register flip-flops are prewired in cascade within the cards in groups of four and two. As used in the TAS unit, these cards are externally strapped to make up a six-bit register section. In the functional diagrams, the internal wiring of the IS-2S cards is shown with dotted lines, and all unconnected $\overline{DS}$ and $\overline{DR}$ inputs at which no functional-nomenclature designator is given should be understood to be grounded.

OTHER CIRCUIT ELEMENTS

Other circuit elements of the unit comprise lamp drivers mounted on IL-5BS cards, a free-running clock multivibrator mounted on an IP-1S card, two delay multivibrators mounted on an IP-2S card, and some circuits built especially for the TAS Unit. The lamp drivers are amplifier-inverters and cause the lamps at their outputs to light whenever their inputs are at a false (positive) level. The free-running multivibrator is adjusted to generate 200-nanosecond clock pulses at a 1-Mc rate. The two delay multivibrators provide a 100-millisecond delay between two specific events. The purposes of the special circuits are given in the functional description in regard to the internal clock and synchronizer, input and input gating circuits and error sign control and output circuits.

What is claimed is:

1. A target acquisition system for use in a complex including a remote range-control central and a number of controlled acquiring stations comprising;

means at the acquiring station for receiving and decoding messages addressed to it;
   said messages including azimuth and elevation instructions which comprise a positioning order for said acquiring station;
   position encoders at the acquiring station which output azimuth and elevation signals corresponding to that station's relative azimuth and elevation;
   position comparing means at said acquiring station for comparing the encoder readings with said positioning orders to obtain an error signal representative of azimuth and elevation;
   said position comparing means including;
   an encoder register for storing the pointing angle of a controlled station;
   an accumulator containing a positioning order at the start of each cycle;
   zeroing means at said acquiring station for compensating for differences between the readings of the position encoders at the acquiring station and the true azimuth and elevation of the acquiring station and outputting a zeroing signal; wherein said zeroing means contains a correction factor representing the difference between said encoder register reading and the true angle of said controlled station; and
   true error determining means for comparing the error signal and the zeroing signal to obtain a true error signal representative of azimuth and elevation.

2. A target acquisition system for use in a complex including a remote range-control central and a number of controlled acquiring stations comprising;
   means at the acquiring station for receiving and decoding messages addressed to it;
   said messages including azimuth and elevation instructions which comprise a positioning order for said acquiring station;
   a message address in said message which includes azimuth and elevation instructions;
   a storage register for storing said message address;
   shift gates operatively connected between the start-of-message detector and said storage register so that the message address may be shifted into the storage register upon receipt of a start-of-message portion;
   position encoders at the acquiring station which output azimuth and elevation signals corresponding to that station's relative azimuth and elevation;
   position comparing means at said acquiring station for comparing the encoder readings with said positioning orders to obtain an error signal representative of azimuth and elevation;
   zeroing means at said acquiring station for compensating for differences between the readings of the position encoders at the acquiring station and the true azimuth and elevation of the acquiring station and outputting a zeroing signal;
   true error determining means for comparing the error signal and the zeroing signal to obtain a true error signal representative of azimuth and elevation;
   said message also including a start-of-message portion; and
   wherein the means at the acquiring station for receiving and decoding messages includes a start-of-message detector which is switched on whenever the decoder detects a start-of-message portion.

3. A target acquisition system as set forth in claim 2 and further including;
   an address detection circuit operatively connected to said storage register for comparing the address stored in the storage register with a preset address in the address detection circuit.

4. A target acquisition system as set forth in claim 3 wherein said controlled acquiring station comprises;
   a theodolite camera with a sighting telescope mounted thereon; and
   said error determining system further includes an error determination circuit coupled to the true error determining means for converting the error angle into square wave signals.

5. A target acquisition system as set forth in claim 5 and further including;
   indicator lamps on the telescope eyepiece which are provided to indicate to an operator the magnitude of error angle.

6. A target acquisition system as set forth in claim 5 and further including;
   an error sign control circuit operatively coupled to the error determination circuit for indicating the direction of error angle which includes left, down, right or up lamp indications.

7. A target acquisition system as set forth in claim 6 wherein;
   the error determination circuit converts the error angle into square wave signals that are used to drive the lamps of the sighting telescope eyepiece in one of four standard modes;
   steady on when the error angle is larger than or equal to 45°, blinking at a 5-cps rate when the error angle is smaller than 45° but larger than or equal to 1.4°, blinking at a 2.5 cycle per second rate when the error signal is smaller than 1.4° but larger than zero and off when the angle error is zero.

8. A target acquisition system as set forth in claim 3 wherein the address detecting circuit comprises;
   address select switches, the number of sets of which correspond to the number of controlled stations;
   address coincidence gates corresponding in number to the sets of switches and receiving the outputs therefrom;
   enabling means;
   said coincidence gates also receiving an enabling pulse from said enabling means; and
   address detection flip-flops, the number of which correspond to the number of sets of switches, receiving the output of said coincidence gates for providing an enabling pulse to said comparison means.

9. A target acquisition system as set forth in claim 8 and further including;
   address latch circuit means for producing an inhibit output upon receipt of an output from any one of said address detection flip-flops;
   said inhibit output being coupled to the input of said respective address coincidence gates for inhbiting the output therefrom until the end of a message.

* * * * *